United States Patent
Salsbury et al.

(10) Patent No.: US 11,163,278 B2
(45) Date of Patent: Nov. 2, 2021

(54) METHOD FOR OPTIMAL SELECTION OF DEADBANDS IN ON/OFF CONTROLLERS

(71) Applicant: Johnson Controls Technology Company, Auburn Hills, MI (US)

(72) Inventors: Timothy I. Salsbury, Mequon, WI (US); John M. House, Saint-Leonard (CA); Carlos Felipe Alcala Perez, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 204 days.

(21) Appl. No.: 16/198,539

(22) Filed: Nov. 21, 2018

(65) Prior Publication Data

US 2020/0159177 A1    May 21, 2020

(51) Int. Cl.
*G05B 19/042*    (2006.01)

(52) U.S. Cl.
CPC .. *G05B 19/042* (2013.01); *G05B 2219/23224* (2013.01)

(58) Field of Classification Search
CPC .......................................... G05B 2219/23224
See application file for complete search history.

(56) References Cited

U.S. PATENT DOCUMENTS

| | | | |
|---|---|---|---|
| 6,216,956 B1 * | 4/2001 | Ehlers | F24F 11/30 236/47 |
| 8,825,185 B2 | 9/2014 | Salsbury et al. | |
| 2007/0230926 A1 * | 10/2007 | Mehlhorn | H02P 27/16 388/811 |
| 2011/0166712 A1 * | 7/2011 | Kramer | G05D 23/1919 700/278 |
| 2018/0299839 A1 * | 10/2018 | Salsbury | G05B 13/022 |
| 2020/0185919 A1 * | 6/2020 | Gardner | H02J 3/004 |
| 2021/0025608 A1 * | 1/2021 | Salsbury | F24F 11/30 |

OTHER PUBLICATIONS

U.S. Appl. No. 16/107,628, filed Aug. 21, 2018, Salsbury et al.
U.S. Appl. No. 15/908,041, filed Feb. 28, 2018, Alcala Perez et al.

* cited by examiner

*Primary Examiner* — Jennifer L Norton
(74) *Attorney, Agent, or Firm* — Foley & Lardner LLP

(57) ABSTRACT

An on-off control system includes on-off equipment configured to operate in either an on state or an off state, an on-off controller configured to cause the equipment to transition between the on state and the off state based on a setpoint value and a deadband value to drive a control variable toward the setpoint value, and a deadband controller, according to some embodiments. In some embodiments, the deadband controller is configured to generate the deadband value used by the on-off controller. In some embodiments, the deadband controller is configured to generate the deadband value by obtaining a cost function that defines a cost based on at least a set of control values and the deadband value and selecting the deadband value that results in an optimal value of the cost function over a range of possible deadband values, the selected deadband value defining an optimal deadband value.

8 Claims, 16 Drawing Sheets

METHOD FOR OPTIMAL SELECTION OF DEADBANDS IN ON/OFF CONTROLLERS

BACKGROUND

The present disclosure relates generally to control systems for an on-off controller. More particularly, the present disclosure relates to determining an optimal deadband value for an on-off controller.

SUMMARY

One implementation of the present disclosure is an on-off control system. The on-off control system includes on-off equipment configured to operate in either an on state or an off state, an on-off controller configured to cause the equipment to transition between the on state and the off state based on a setpoint value and a deadband value to drive a control variable toward the setpoint value, and a deadband controller, according to some embodiments. In some embodiments, the deadband controller is configured to generate the deadband value used by the on-off controller. In some embodiments, the deadband controller is configured to generate the deadband value by obtaining a cost function that defines a cost based on at least a set of control values and the deadband value and selecting the deadband value that results in an optimal value of the cost function over a range of possible deadband values, the selected deadband value defining an optimal deadband value.

In some embodiments the deadband controller is configured to perform extremum seeking control to minimize the cost function to determine the deadband value that results in the optimal value of the cost function.

In some embodiments the cost function includes on at least one of a determined difference between a peak and a trough of a collected set of control variable values, an absolute error of the collected set of control variable values relative to the setpoint, a mean squared error of the collected set of control variable values relative to the setpoint, and an exponentially weighted average of the mean squared error of the collected set of control variable values.

In some embodiments the deadband controller is configured to generate the deadband value based on an empirical relationship between the determined difference and an optimal deadband value.

In some embodiments the deadband controller is configured to cause the on-off controller to operate with a negligible deadband value and collect the set of control variable values over a predetermined time horizon.

In some embodiments the deadband controller is configured to generate the deadband value by generating a dither signal for a signal associated with adjusting the deadband value of the on-off controller. In some embodiments the deadband controller is configured to determine the optimal deadband value by filtering the mean squared error of the collected set of control variable values.

In some embodiments the deadband controller is configured to modulate the deadband of the on-off controller to generate the deadband value.

In some embodiments the cost function includes one or more terms that account for at least one of equipment wear, cycle frequency, and control performance.

Another implementation of the present disclosure is a method for controlling on-off equipment with an optimal deadband value. The method includes setting a deadband value for an on-off controller to a negligible value, allowing the on-off controller to perform two or more cycles and storing control variable information, setpoint information, and deadband information, estimating a peak-to-trough amplitude of the stored control variable information, estimating an optimal deadband value based on an empirical equation and the estimate peak-to-trough amplitude, generating a control signal for the on-off equipment using the optimal deadband value, and operating the on-off equipment using the control signal, according to some embodiments. In some embodiments, operating the on-off equipment includes causing the on-off equipment to activate or deactivate to drive a control variable to a setpoint.

In some embodiments the method includes sending a control signal to the on-off controller to adjust the on-off controller deadband value to the negligible deadband value.

In some embodiments, the optimal deadband value results in a minimization of a mean squared error of the control variable relative to a setpoint of the on-off controller over a time horizon.

In some embodiments, the empirical equation relates the optimal deadband value to peak-to-trough amplitude of control variable information resulting from an on-off control system with a negligible deadband value.

In some embodiments, the empirical equation is a curve-fit equation of data resulting from a multiple tests identifying an optimal deadband value of multiple of on-off control systems and a peak-to-trough amplitude of the multiple of on-off control systems which results in the optimal deadband value for the multiple on-off control systems.

In some embodiments, the empirical equation is a second order polynomial.

Another implementation of the present disclosure is a method for controlling on-off equipment with an optimal deadband value. In some embodiments, the method includes determining an error between a setpoint value and a control variable value of an on-off control system, determining a squared error based on the determined error, storing a set of squared errors over a time horizon, determining an exponentially weighted moving average of the set of stored squared errors, minimizing the exponentially weighted moving average to determine the optimal deadband value by adjusting a deadband value of the on-off control system, generating a control signal for the on-off equipment using the optimal deadband value, and operating the on-off equipment using the control signal. In some embodiments, operating the on-off equipment includes causing the on-off equipment to activate or deactivate to drive a control variable to a setpoint.

In some embodiments the method includes determining a cost function based on the exponentially weighted moving average and providing the cost function to an extremum seeking controller.

In some embodiments, the extremum seeking controller is configured to minimize a gradient of the cost function with respect to the deadband value by modulating the deadband value of the on-off control system and observing a value of the cost function.

In some embodiments, the error, squared error, and exponentially weighted moving average are determined periodically at an end of a timestep.

In some embodiments, the deadband value of the on-off control system is adjusted by sending a dithered control signal to the on-off controller.

In some embodiments the cost function includes one or more terms to ensure that the optimal deadband value optimizes at least one of excessive equipment wear and control performance.

DETAILED DESCRIPTION

Overview

Figure 1:
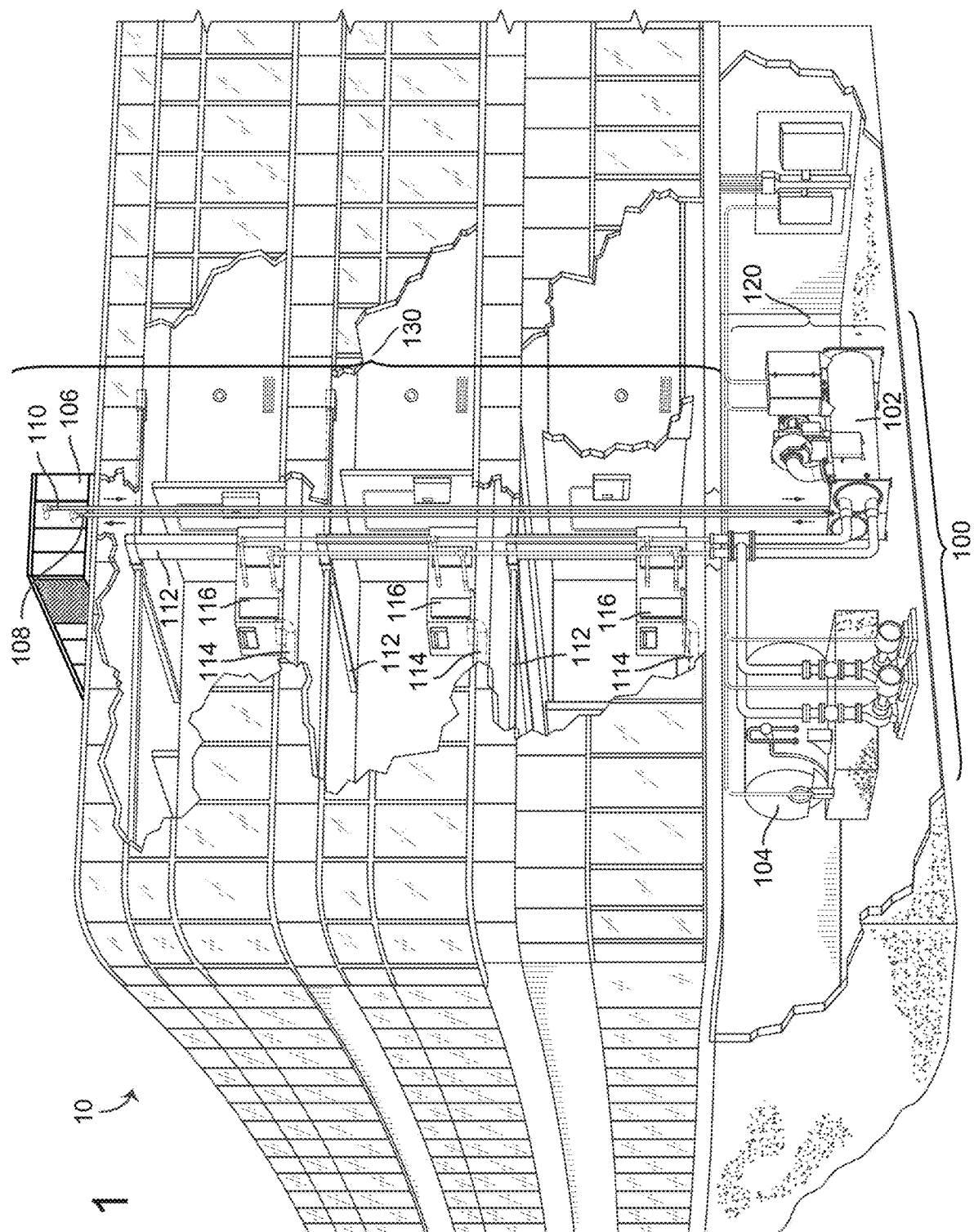
FIG. 1 is a drawing of a building equipped with a HVAC system, according to some embodiments.

Referring generally to the FIGURES, systems and methods for estimating an optimal deadband value for an on-off control system are shown, according to various exemplary embodiments. The optimal deadband value can be used by the on-off control system for controlling a plant. The plant may be, for example, part of a heating, venting, and air conditioning (HVAC) system, or other control system. The optimal deadband value can significantly improve the performance of the control system as compared to an improperly set deadband value. If deadbands in on/off controllers are set too small this leads to limit cycling in equipment due to minimum on and off timers. If deadbands are set too large comfort is compromised. This present disclosure solves the problem of identifying optimal deadbands regardless of system type. The optimal deadband value may be determined by a method including a heuristic method and/or an extremum seeking control method. The method includes sampling control variable information from an on-off controller system with the on-off controller set to a negligible deadband value over a time horizon, according to some embodiments. Using the control variable information from the on-off controller over the time horizon and a setpoint of the on-off controller, a mean squared error can be calculated. The mean squared error can be used to quantify an average deviation of the control variable from the setpoint over the time horizon, according to some embodiments. In some embodiments, the control variable information can be re-iteratively collected for varying deadband values, and an optimal deadband value for the on-off system can be determined based on the deadband value which results in the lowest mean squared error. In some embodiments, a peak-to-trough amplitude of the control variable information when the on-off controller operates at the negligible deadband value is determined. In some embodiments, an empirically determined relationship between the optimal deadband value (where the optimal deadband value is the deadband value which results in a minimal mean squared error) and the peak-to-trough amplitude of the on-off system operating with a negligible deadband value can be used to determine the optimal deadband value for any given on-off system. For example, the empirical relationship can be determined using a variety of on-off systems having various properties, and can be used to determine the optimal deadband value for a given on-off system based on the peak-to-trough amplitude of the given on-off system operating with a negligible deadband value. In this way, any given on-off system may be allowed to operate over a predetermined time horizon with a negligible deadband value, and a peak-to-trough amplitude of the received control variable information may be determined. The empirical relationship may then be used to determine an optimal deadband value for the given system using the determined peak-to-trough amplitude.

In some embodiments, a relationship between the mean squared error and the deadband value may have a convex shape, and thus an extremum seeking control method is used to determine the optimal deadband value. Using the mean squared error (or the squared error for a given sample), an exponentially weighted moving average may be calculated. The exponentially weighted moving average may be used as a cost function for an extremum seeking controller. The extremum seeking controller may minimize the cost function by modulating the deadband value and allowing the on-off system to operate over a predetermined time horizon. In some embodiments, the extremum seeking controller functions in a closed-loop control system. In some embodiments, the extremum seeking controller generates a dither signal and applies the dither signal to a signal sent to the on-off controller to adjust the deadband value of the on-off controller. The extremum seeking controller may observe the mean squared error of the control variable value (filtered over the predetermined time horizon). In this way, the extremum seeking controller may minimize a gradient of the mean squared error with respect to the deadband value. In some embodiments, the cost function includes one or more terms (which may have assigned weights) to take into account equipment wear and control performance.

Building HVAC Systems and Building Management Systems

Figure 2:
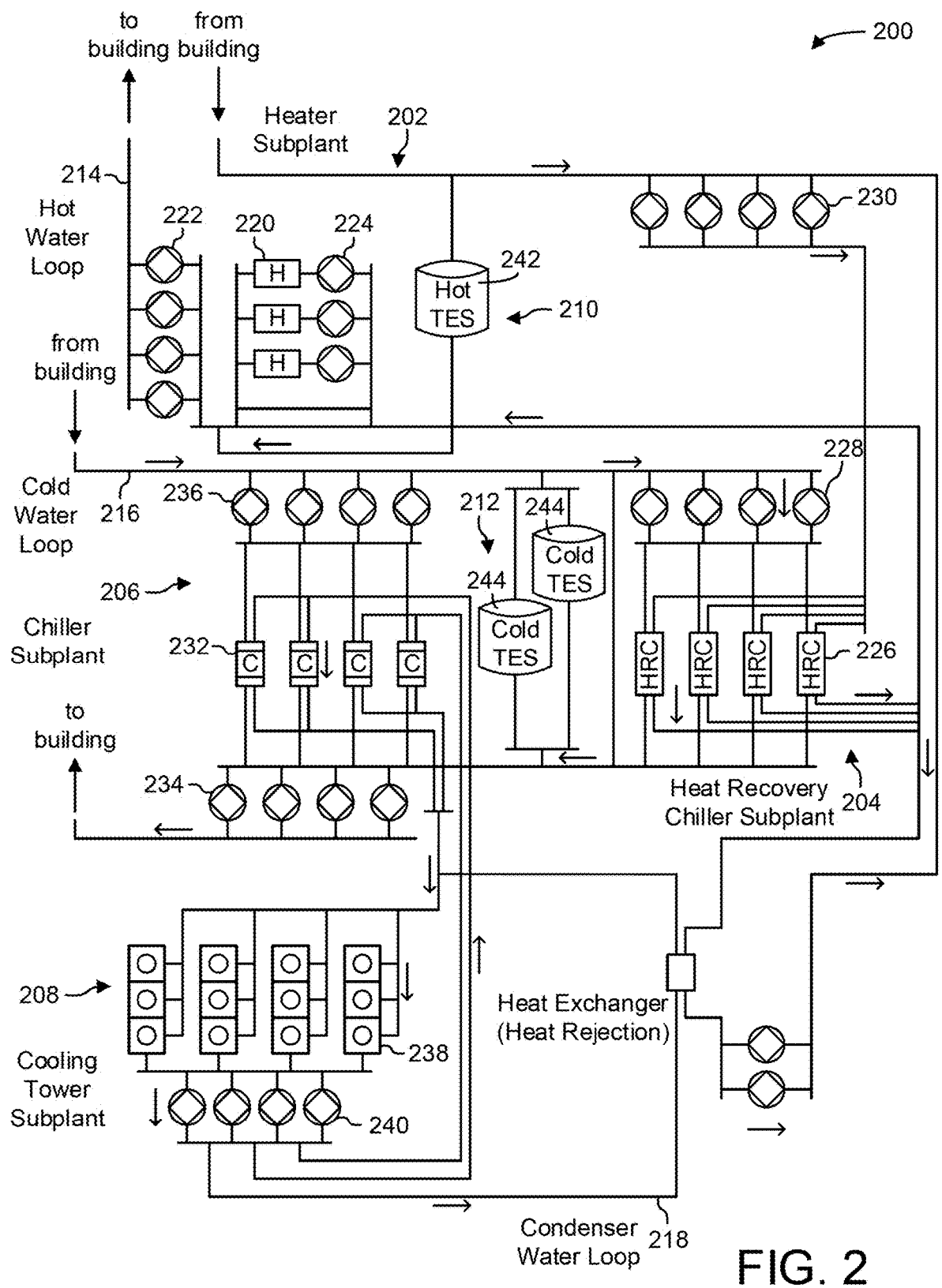
FIG. 2 is a schematic diagram of a waterside system which can be used in conjunction with the building of FIG. 1, according to some embodiments.
Figure 3:
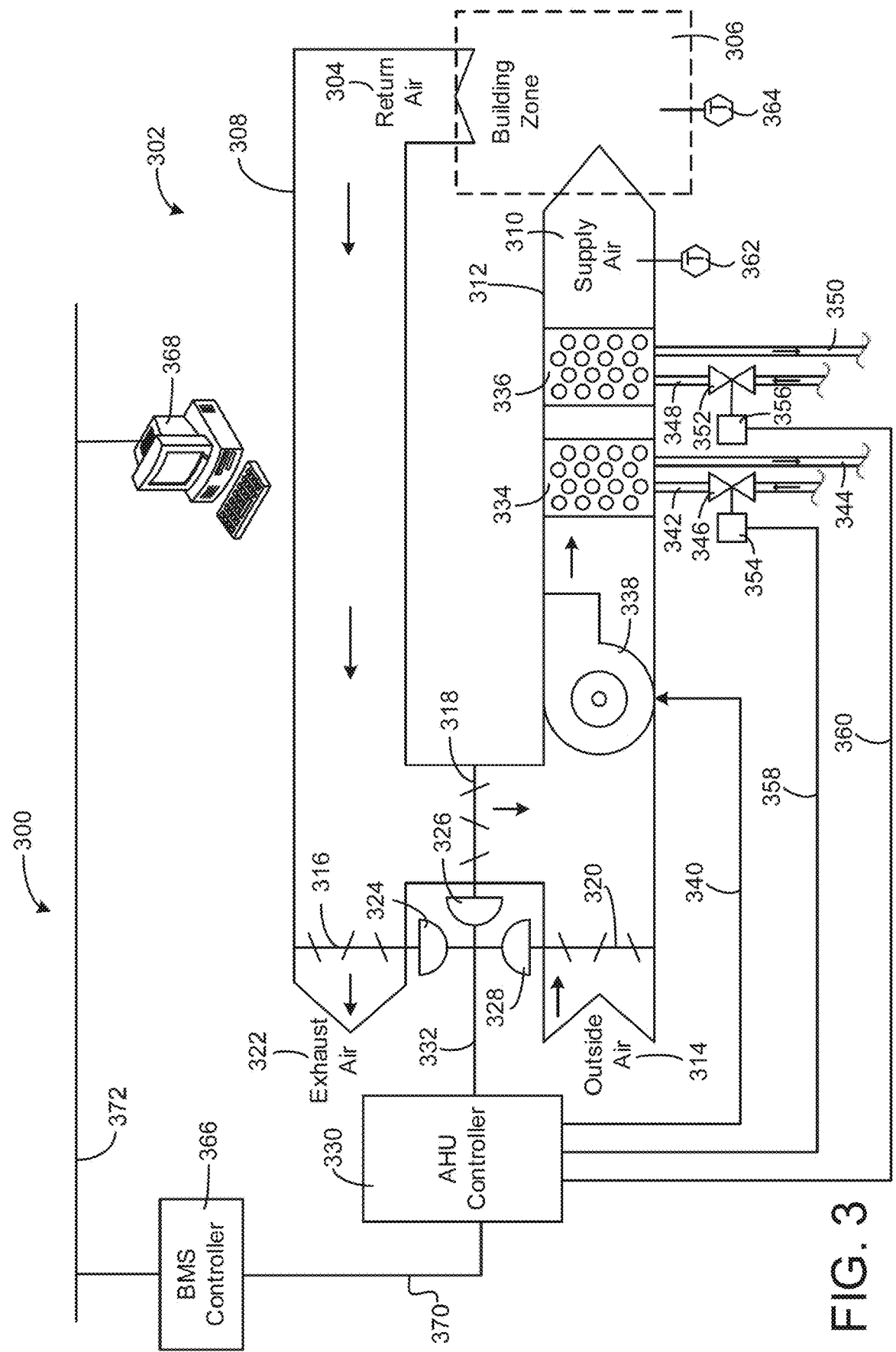
FIG. 3 is a schematic diagram of an airside system which can be used in conjunction with the building of FIG. 1, according to some embodiments.
Figure 4:
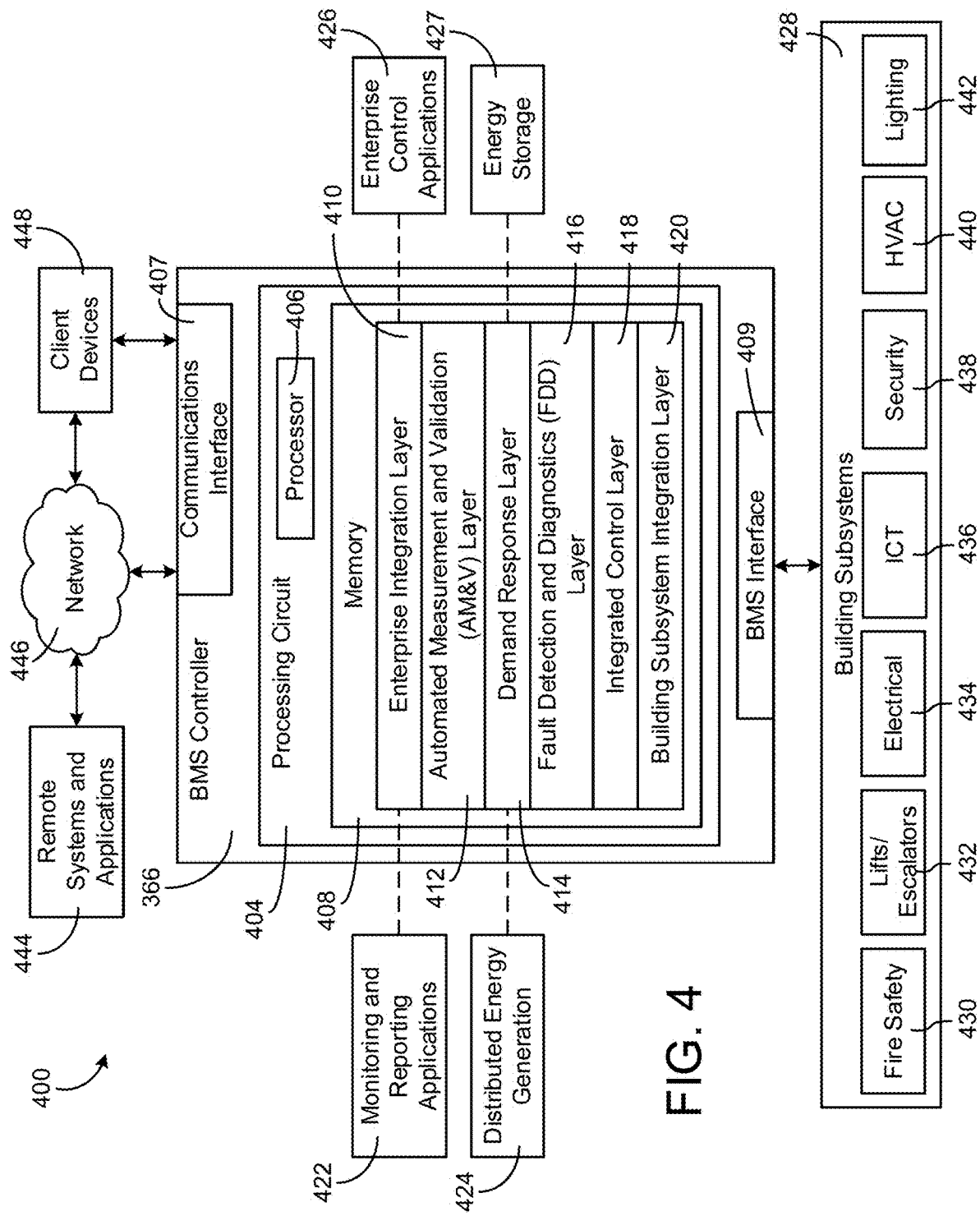
FIG. 4 is a block diagram of a building management system (BMS) which can be used to monitor and control the building of FIG. 1, according to some embodiments.
Figure 5:
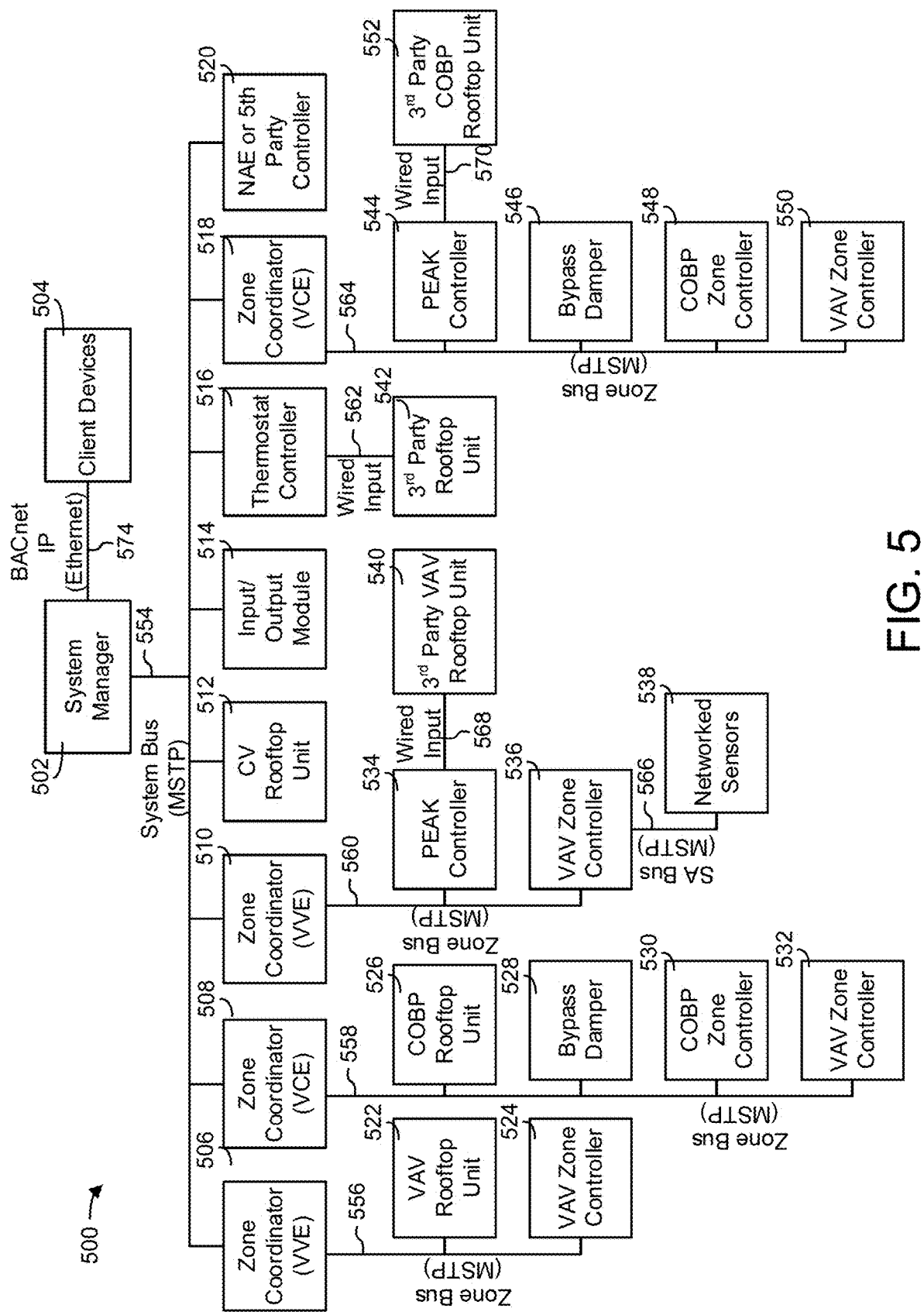
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200(e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively.

Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Extremum-Seeking Control Systems

Figure 6:
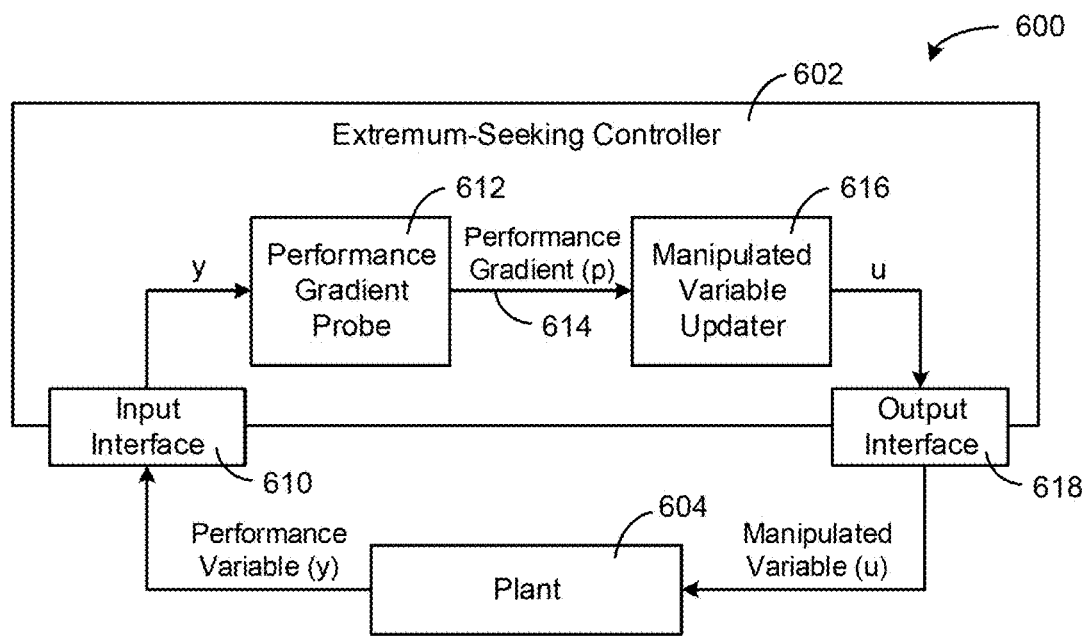
FIG. 6 is a block diagram of an extremum-seeking control (ESC) system which uses a periodic dither signal to perturb a control input provided to a plant, according to some embodiments.

Referring now to FIG. 6, a block diagram of an extremum-seeking control (ESC) system 600 with a periodic dither signal is shown, according to some embodiments. ESC system 600 is shown to include an extremum-seeking controller 602 and a plant 604, according to some embodiments. A plant in control theory is the combination of a process and one or more mechanically-controlled outputs, according to some embodiments. For example, plant 604 can be an air handling unit configured to control temperature within a building space via one or more mechanically-controlled actuators and/or dampers. In various embodiments, plant 604 can include a chiller operation process, a damper adjustment process, a mechanical cooling process, a ventilation process, a refrigeration process, or any other process in which an input variable to plant 604 (i.e., manipulated variable u) is adjusted to affect an output from plant 604 (i.e., performance variable y).

Extremum-seeking controller 602 uses extremum-seeking control logic to modulate the manipulated variable u, according to some embodiments. For example, controller 602 may use a periodic (e.g., sinusoidal) perturbation signal or dither signal to perturb the value of manipulated variable u in order to extract a performance gradient p. The manipulated variable u can be perturbed by adding periodic oscillations to a DC value of the performance variable u, which may be determined by a feedback control loop. The performance gradient p represents the gradient or slope of the performance variable y with respect to the manipulated variable u, according to some embodiments. Controller 602 uses extremum-seeking control logic to determine a value for the manipulated variable u that drives the performance gradient p to zero, according to some embodiments.

Controller 602 may determine the DC value of manipulated variable u based on a measurement or other indication of the performance variable y received as feedback from plant 604 via input interface 610. Measurements from plant 604 can include, but are not limited to, information received from sensors about the state of plant 604 or control signals sent to other devices in the system. In some embodiments, the performance variable y is a measured or observed position of one of valves 354-356. In some embodiments, the performance variable y is a measured or calculated amount of power consumption, a fan speed, a damper position, a temperature, or any other variable that can be measured or calculated by plant 604. Performance variable y can be the variable that extremum-seeking controller 602 seeks to optimize via an extremum-seeking control technique. Performance variable y can be output by plant 604 or observed at plant 604 (e.g., via a sensor) and provided to extremum-seeking controller at input interface 610.

Input interface 610 provides the performance variable y to performance gradient probe 612 to detect the performance gradient 614, according to some embodiments. Performance gradient 614 may indicate a slope of the function y=f (u), where y represents the performance variable received from plant 604 and u represents the manipulated variable provided to plant 604. When performance gradient 614 is zero, the performance variable y has an extremum value (e.g., a maximum or minimum), according to some embodiments. Therefore, extremum-seeking controller 602 can optimize the value of the performance variable y by driving performance gradient 614 to zero.

Manipulated variable updater 616 produces an updated manipulated variable u based upon performance gradient 614, according to some embodiments. In some embodiments, manipulated variable updater 616 includes an integrator to drive performance gradient 614 to zero. Manipulated variable updater 616 then provides an updated manipulated variable u to plant 604 via output interface 618, according to some embodiments. In some embodiments, manipulated variable u is provided to one of dampers 324-328 (FIG. 2) or an actuator affecting dampers 324-328 as a control signal via output interface 618. Plant 604 can use manipulated variable u as a setpoint to adjust the position of dampers 324-328 and thereby control the relative proportions of outdoor air 314 and return air 304 provided to a temperature-controlled space.

Figure 7:
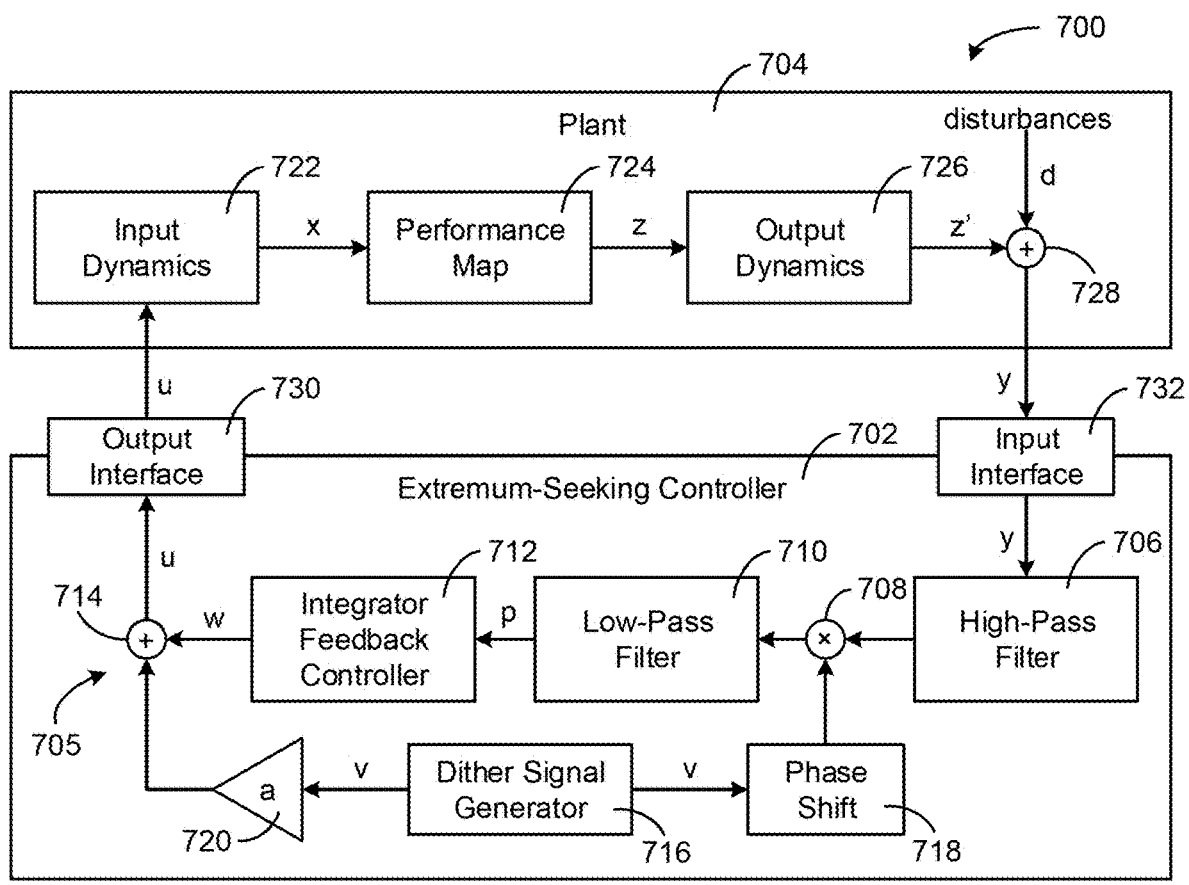
FIG. 7 is a block diagram of another ESC system which uses a periodic dither signal to perturb a control input provided to a plant, according to some embodiments.

Referring now to FIG. 7, a block diagram of another ESC system 700 with a periodic dither signal is shown, according to some embodiments. ESC system 700 is shown to include a plant 704 and an extremum-seeking controller 702, according to some embodiments. Controller 702 uses an extremum-seeking control strategy to optimize a performance variable y received as an output from plant 704, according to some embodiments. Optimizing performance variable y can include minimizing y, maximizing y, controlling y to achieve a setpoint, or otherwise regulating the value of performance variable y.

Plant 704 can be the same as plant 604 or similar to plant 604, as described with reference to FIG. 3. For example, plant 704 can be a combination of a process and one or more mechanically-controlled outputs. In some embodiments, plant 704 is an air handling unit configured to control temperature within a building space via one or more mechanically-controlled actuators and/or dampers. In some embodiments, plant 704 can include a chiller operation process, a damper adjustment process, a mechanical cooling process, a ventilation process, or any other process that generates an output based on one or more control inputs.

Plant 704 can be represented mathematically as a combination of input dynamics 722, a performance map 724, output dynamics 726, and disturbances d. In some embodiments, input dynamics 722 are linear time-invariant (LTI) input dynamics and output dynamics 726 are LTI output dynamics. Performance map 724 can be a static nonlinear performance map. Disturbances d can include process noise, measurement noise, or a combination of both. Although the components of plant 704 are shown in FIG. 7, it should be noted that the actual mathematical model for plant 704 does not need to be known in order to apply ESC, according to some embodiments.

Plant 704 receives a control input u (e.g., a control signal, a manipulated variable, etc.) from extremum-seeking controller 702 via output interface 730, according to some embodiments. Input dynamics 722 may use the control input u to generate a function signal x based on the control input (e.g., x=f (u)). Function signal x may be passed to performance map 724 which generates an output signal z as a function of the function signal (i.e., z=f (x)). The output signal z may be passed through output dynamics 726 to produce signal z', which is modified by disturbances d at element 728 to produce performance variable y (e.g., y=z'+d). Performance variable y is provided as an output from plant 704 and received at extremum-seeking controller 702, according to some embodiments. Extremum-seeking controller 702 may seek to find values for x and/or u that optimize the output z of performance map 724 and/or the performance variable y.

Still referring to FIG. 7, extremum-seeking controller 702 is shown receiving performance variable y via input interface 732 and providing performance variable y to a control loop 705 within controller 702, according to some embodiments. Control loop 705 is shown to include a high-pass filter 706, a demodulation element 708, a low-pass filter 710, an integrator feedback controller 712, and a dither signal element 714, according to some embodiments. Control loop 705 may be configured to extract a performance gradient p from performance variable y using a dither-demodulation technique. Integrator feedback controller 712 analyzes the performance gradient p and adjusts the DC value of the plant input (i.e., the variable w) to drive performance gradient p to zero, according to some embodiments.

The first step of the dither-demodulation technique is performed by dither signal generator 716 and dither signal element 714, according to some embodiments. Dither signal generator 716 generates a periodic dither signal v, which is typically a sinusoidal signal, according to some embodiments. Dither signal element 714 receives the dither signal v from dither signal generator 716 and the DC value of the plant input w from controller 712, according to some embodiments. Dither signal element 714 combines dither signal v with the DC value of the plant input w to generate the perturbed control input u provided to plant 704 (e.g., u=w+v), according to some embodiments. The perturbed control input u is provided to plant 704 and used by plant 704 to generate performance variable y as previously described, according to some embodiments.

The second step of the dither-demodulation technique is performed by high-pass filter 706, demodulation element 708, and low-pass filter 710, according to some embodiments. High-pass filter 706 filters the performance variable y and provides the filtered output to demodulation element 708, according to some embodiments. Demodulation element 708 demodulates the output of high-pass filter 706 by multiplying the filtered output by the dither signal v with a phase shift 718 applied, according to some embodiments. The DC value of this multiplication is proportional to the performance gradient p of performance variable y with respect to the control input u, according to some embodiments. The output of demodulation element 708 is provided to low-pass filter 710, which extracts the performance gradient p (i.e., the DC value of the demodulated output), according to some embodiments. The estimate of the performance gradient p is then provided to integrator feedback controller 712, which drives the performance gradient estimate p to zero by adjusting the DC value w of the plant input u, according to some embodiments.

Still referring to FIG. 7, extremum-seeking controller 702 is shown to include an amplifier 720, according to some embodiments. It may be desirable to amplify the dither signal v such that the amplitude of the dither signal v is large enough for the effects of dither signal v to be evident in the plant output y. The large amplitude of dither signal v can result in large variations in the control input u, even when the DC value w of the control input u remains constant. Due to the periodic nature of the dither signal v, the large variations in the plant input u (i.e., the oscillations caused by the dither signal v) are often noticeable to plant operators, according to some embodiments.

Additionally, it may be desirable to carefully select the frequency of the dither signal v to ensure that the ESC strategy is effective. For example, it may be desirable to select a dither signal frequency $\omega_v$ based on the natural frequency $\omega_n$ of plant 604 to enhance the effect of the dither signal v on the performance variable y. It can be difficult and challenging to properly select the dither frequency $\omega_v$ without knowledge of the dynamics of plant 704. For these reasons, the use of a periodic dither signal v is one of the drawbacks of traditional ESC, according to some embodiments.

In ESC system 700, the output of high-pass filter 706 can be represented as the difference between the value of the performance variable y and the expected value of the performance variable y, as shown in the following equation:

$$\text{Output of High-Pass Filter: } y - E[y]$$

where the variable E[y] is the expected value of the performance variable y. The result of the cross-correlation performed by demodulation element 708 (i.e., the output of demodulation element 708) can be represented as the product of the high-pass filter output and the phase-shifted dither signal, as shown in the following equation:

$$\text{Result of Cross-Correlation: } (y-E[y])(v-E[v])$$

where the variable E[v] is the expected value of the dither signal v. The output of low-pass filter 710 can be represented as the covariance of the dither signal v and the performance variable y, as shown in the following equation:

$$\text{Output of Low-Pass Filter: } E[(y-E[y])(v-E[u])] = \text{Cov}(v,y)$$

where the variable E[u] is the expected value of the control input u.

The preceding equations show that ESC system 700 generates an estimate for the covariance Cov(v, y) between the dither signal v and the plant output (i.e., the performance variable y), according to some embodiments. The covariance Cov(v, y) can be used in ESC system 700 as a proxy for the performance gradient p. For example, the covariance Cov(v, y) can be calculated by high-pass filter 706, demodulation element 708, and low-pass filter 710 and provided as a feedback input to integrator feedback controller 712. Integrator feedback controller 712 can adjust the DC value w of the plant input u in order to minimize the covariance Cov(v, y) as part of the feedback control loop.

On-Off Deadband Controller

Figure 8:
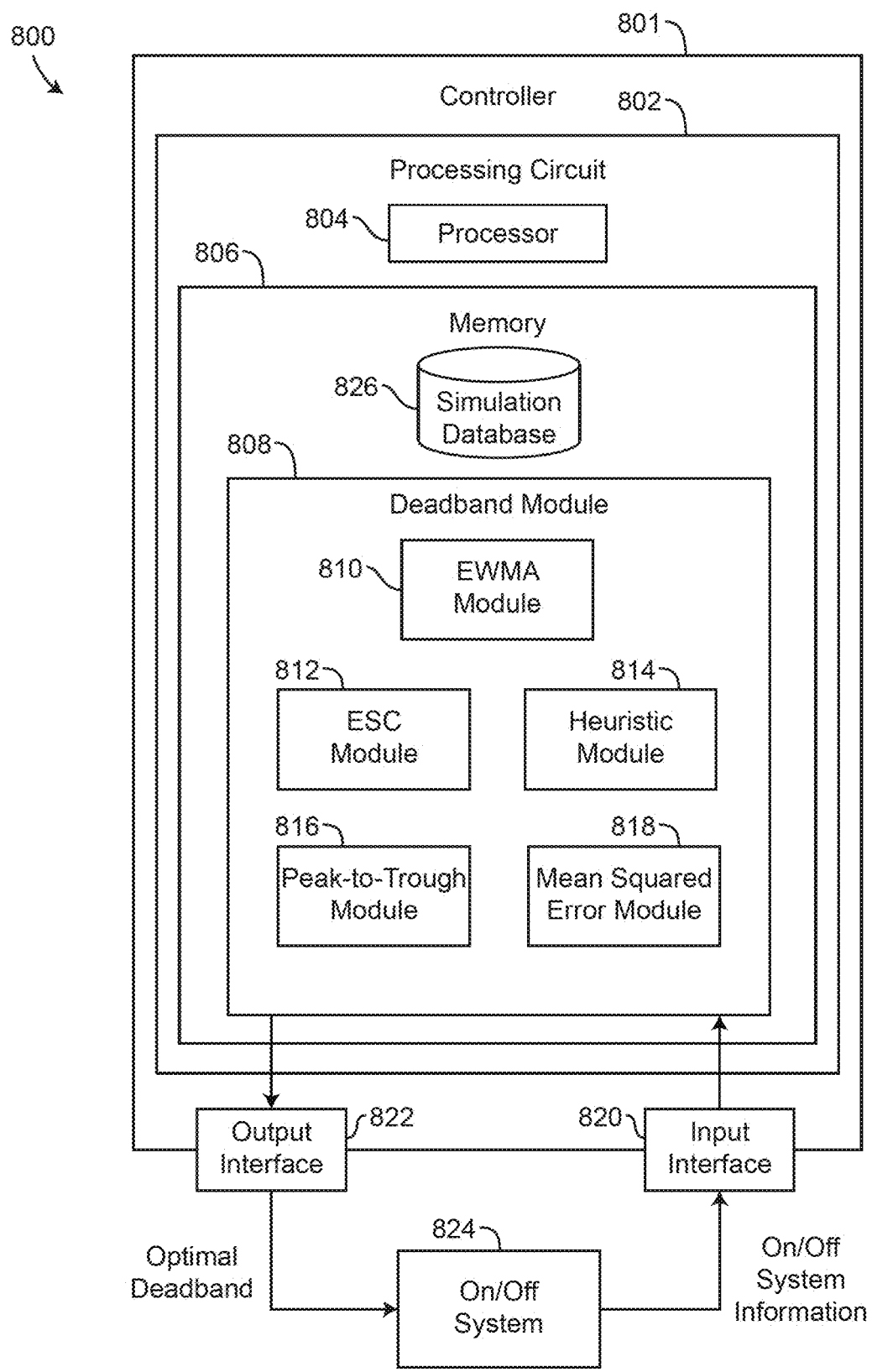
FIG. 8 is a block diagram of a controller configured to determine an optimal deadband value for an on-off controller of an on-off system, according to some embodiments.

Referring now to FIG. 8, a smart on-off controller system, shown as system 800 is shown, according to some embodiments. System 800 is shown to include a deadband controller 801, configured to adjust an operation of on/off system 824, according to some embodiments. Deadband controller 801 is configured to determine an optimal deadband for on/off system 824, according to some embodiments. In some embodiments, on/off system 824 includes an on/off controller (e.g., as described hereinabove) and equipment configured to be controlled by the on/off controller (e.g., a cooling device, a heating device, etc.). In some embodiments, on/off system 824 includes any of plant 604 and plant 704. In some embodiments, on/off system 824 is configured to adjust an operation of the equipment between an operational state and an in-operational state to substantially maintain a control variable.

Referring still to FIG. 8, deadband controller 801 is shown to include a processing circuit 802 including a processor 804 and memory 806, according to some embodiments. Processing circuit 802 can be communicably connected to input interface 820 and/or output interface 822 such that processing circuit 802 and the various components thereof can send and receive data via interfaces 820, 822. Processor 804 can be implemented as a general purpose processor, an application specific integrated circuit (ASIC), one or more field programmable gate arrays (FPGAs), a group of processing components, or other suitable electronic processing components.

Memory 806 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 806 can be or include volatile memory or non-volatile memory. Memory 806 can include database components, object code components, script components, or any other type of information structure for supporting the various activities and information structures described in the present application. According to some embodiments, memory 806 is communicably connected to processor 804 via processing circuit 802 and includes computer code for executing (e.g., by processing circuit 802 and/or processor 804) one or more processes described herein.

Interfaces 820, 822 can be or include wired or wireless communications interfaces (e.g., jacks, antennas, transmitters, receivers, transceivers, wire terminals, etc.) for conducting data communications with on/off system 824 or other external systems or devices. In various embodiments, communications via interfaces 820, 822 can be direct (e.g., local wired or wireless communications) or via a communications network (e.g., a WAN, the Internet, a cellular network, etc.). For example, interfaces 820, 822 can include an Ethernet card and port for sending and receiving data via an Ethernet-based communications link or network. In another example, interfaces 820, 822 can include a Wi-Fi transceiver for communicating via a wireless communications network. In another example, one or both of interfaces 820, 822 can include cellular or mobile phone communications transceivers.

Referring still to FIG. 8, memory 806 is shown to include a database, shown as simulation database 826, according to some embodiments. In some embodiments, simulation database 826 is configured to store any simulation data (e.g., setpoint sample values) of any of on/off system 824, an on/off controller of on/off system 824, and any equipment of on/off system 824. Simulation database 826 may be configured to supply deadband module 808 with any of the simulation data. Deadband module 808 is configured to determine an optimal deadband range for on/off system 824, according to some embodiments. Deadband module 808 may use any of the methods described herein to determine the optimal deadband range for on/off system 824. Deadband module 808 is shown to include an exponentially weighted moving average (EWMA) module 810, an extremum seeking control (ESC) module 812, a heuristic module 814, a peak-to-trough module 816, and a mean squared error (MSE) module 818, according to some embodiments.

Referring still to FIG. 8, deadband module 808 is shown receiving on/off system information from on/off system 824 through input interface 820, according to some embodiments. The on/off system information may be any of a setpoint of on/off system 824, a value of a control variable of on/off system 824, a current deadband value of on/off system 824, etc., according to some embodiments. In some embodiments, deadband module 808 is configured to store any or all of the on/off system information received through input interface 820 in simulation database 826. In some embodiments, deadband module 808 uses the on/off system information received through input interface 820 to determine an optimal deadband value for on/off system 824, as described herein. Deadband module 808 is shown outputting an optimal deadband value to on/off system 824 through output interface 822, according to some embodiments. In some embodiments, the optimal deadband value output to on/off system 824 through output interface 822 is a control signal configured to adjust an operation of a controller of on/off system 824 to update a current deadband value of the controller.

Referring still to FIG. 8, deadband module 808 is shown to include MSE module 818, according to some embodiments. In some embodiments, MSE module 818 is configured to determine a mean squared error based over a time interval based on the on/off system information received from on/off system 824 through input interface 820. In some embodiments, the on/off system information received from on/off system 824 is a set of values of a control variable of on/off system 824. In some embodiments, each of the set of values of the control variable are collected at an end of a time step. For example, in some embodiments, deadband module 808 receives a value every 0.5 seconds (or 0.1 seconds, or any other time interval), where the value is a value of the control variable. In the case of a thermostat, for example, deadband module 808 may receive a value of a temperature in a room at the end of every time interval. In some embodiments, the information received from on/off system 824 is stored in a database of memory 806 (e.g., simulation database 826). Mean squared error module 818 may determine the mean squared error of the set of values of the control variable by using the equation:

$$MSE = \frac{1}{n}\sum_{i=1}^{n}(Y_i - \hat{Y})^2.$$

In the MSE equation, n is the number of samples of the set of samples of the control variable, $Y_i$ is the value of an element i of the set of samples of the control variable, and $\hat{Y}$ is the setpoint value of the control variable.

In some embodiments, MSE module 818 is configured to store the MSE of the set of values of the control variable and the corresponding deadband value. In some embodiments, the process is iteratively repeated, each iteration with a different deadband value. In some embodiments, the MSE and the corresponding deadband value of each of the iterations is stored in MSE module 818, such that a deadband value which minimizes the MSE can be determined. In some embodiments, each of the sets of values of the control variable is stored in simulation database 826. In some embodiments, the MSE and corresponding deadband value of each of the iterations is stored in simulation database 826.

In this way, deadband controller 801 may be configured to perform a data collection process. For example, deadband controller 801 may iteratively change the deadband value of the controller of on/off system 824, allow the on/off system 824 to run for a predetermined amount of time, collect control value samples over the predetermined amount of time, determine an MSE of each of the iterations based on the control value samples, and store the control value samples, MSE, and corresponding deadband value of each of the iterations. In some embodiments, any or all of the aforementioned information is stored in simulation database 826.

Figure 9:
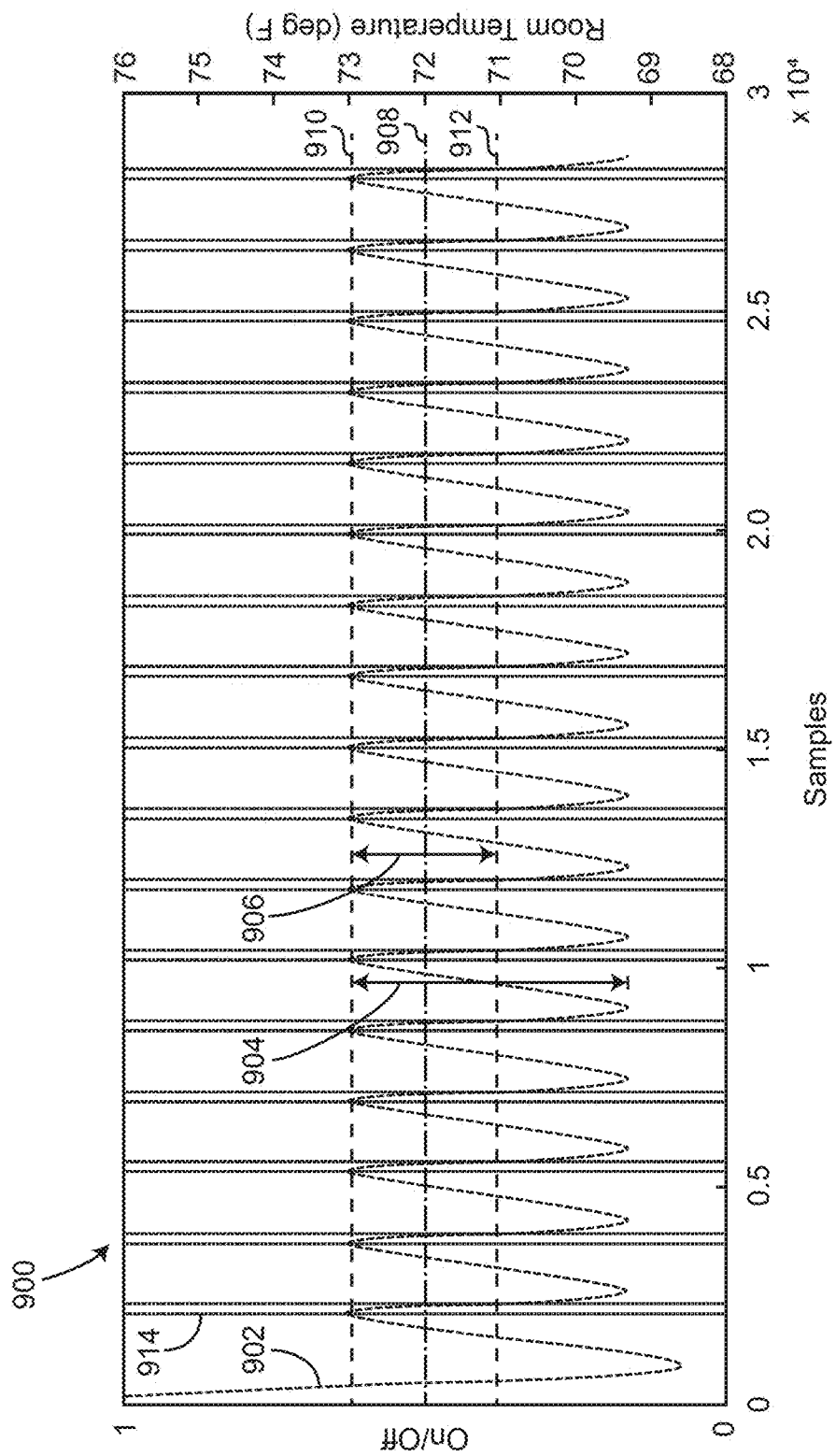
FIG. 9 is a graph showing typical operation of an on-off cooling system, according to some embodiments.

Referring still to FIG. 8, deadband module 808 is shown to include peak-to-trough module 816, according to some embodiments. Peak-to-trough module 816 is configured to determine an amplitude of the on/off system information received through input interface 820, according to some embodiments. In some embodiments, the amplitude of the on/off system information is defined as a difference between a peak and a trough of the control value samples. In some embodiments, on/off system 824 is allowed to complete several cycles before the peak-to-trough amplitude is determined by peak-to-trough module 816. An example of the peak-to-trough amplitude is shown in FIG. 9 and described in greater reference below with reference to FIG. 9, according to some embodiments. In some embodiments, the peak-to-trough amplitude is an average of several peak-to-trough amplitudes.

Referring still to FIG. 8, deadband module 808 is shown to include EWMA module 810, according to some embodiments. In some embodiments, EWMA module 810 is configured to determine an exponentially weighted moving average of the MSE. EWMA module 810 may receive mean squared error information from MSE module 818 and determine the exponentially weighted moving average of the mean squared error information. In some embodiments, EWMA module 810 provides the determined exponentially weighted moving average to ESC module 812 and/or heuristic module 814.

Referring still to FIG. 8, deadband module 808 is shown to include heuristic module 814, according to some embodiments. In some embodiments, heuristic module 814 is configured to perform a heuristic method to determine the optimal deadband value of on/off system 824. In some embodiments, heuristic module 814 receives at least one of the MSE from MSE module 818, the amplitude (e.g., peak-to-trough information) from peak-to-trough module 816, any of the on/off system information received through input interface 820, and any of an equation, a set of equations, a dataset, etc., from simulation database 826. In some embodiments, heuristic module 814 is configured to perform any of the functions of the heuristic method discussed in greater detail below with reference to FIGS. 11-12. Heuristic module 814 may be configured to output the optimal deadband value to output interface 822. In some embodiments, heuristic module 814 generates a control signal to adjust the on/off controller of on/off system 824 to operate with the optimal deadband value.

Referring still to FIG. 8, deadband module 808 is shown to include ESC module 812, according to some embodiments. In some embodiments, ESC module 812 is configured to perform an extremum seeking control to determine the optimal deadband value. In some embodiments, ESC module 812 is configured to perform any of the methods or functionality described in greater detail below with reference to FIGS. 13-16. ESC module 812 receives at least one of the MSE from MSE module 818, the amplitude (e.g., peak-to-trough information) from peak-to-trough module 816, the EWMA from EWMA module 810, any of the on/off system information received through input interface 820, and any of an equation, a set of equations, a dataset, etc., from simulation database 826, according to some embodiments. In some embodiments, ESC module 812 is configured to perform any of the functions of ESC controller 602, described in greater detail above with reference to FIG. 6. In some embodiments, ESC module 812 is configured to perform a descent method to locate the optimal deadband value. In some embodiments, ESC module 812 performs an ESC algorithm which includes generating a dither signal for the deadband and observing the MSE (filtered over a time horizon). The goal of the ESC algorithm is to minimize the gradient of the MSE with respect to the deadband. In some embodiments, ESC module 812 uses the exponentially weighted moving average of the MSE as a cost function, and attempts to minimize the cost function by adjusting the deadband for the on-off controller (e.g., the on-off controller of on-off system 824).

Referring now to FIG. 9, a graph 900 of an example of on/off system information is shown, according to some embodiments. In the example shown in FIG. 9, graph 900 represents a simulated cooling system serving a room, controlled by an on-off controller, having a setpoint 908 at 72 degrees Fahrenheit, and a deadband 906 of +/−1 degrees Fahrenheit, centered about setpoint 908. Deadband 906 defines an upper limit 910, having a value of 73 degrees Fahrenheit, and a lower limit 912, having a value of 71 degrees Fahrenheit, according to some embodiments. Graph 900 is shown to include series 902, according to some embodiments. In some embodiments, series 902 is made up of sample values of the control variable. Series 902 is a scatter plot, according to some embodiments. When the temperature in the room exceeds upper limit 910 defined by deadband 906, the on-off controller is configured to turn on a cooling device to the room, according to some embodiments. When the temperature in the room drops below lower limit 912, the on-off controller is configured to turn off the cooling device to the room, according to some embodiments.

Series 902 is shown to include a peak-to-trough value 904, according to some embodiments. In the example shown, peak-to-trough value 904 is defined as a difference between a peak and a trough of series 902, according to some embodiments. Higher-order dynamics of the system coupled with the room cause inertia in the response that lead to the actual temperature over- and under-shooting deadband 906 in an asymmetrical manner, according to some embodiments. The effect of the over- and under-shooting is that the average setpoint error is non-zero, according to some embodiments. This asymmetry is affected by the size of deadband 906 and causing different levels of control performance for different deadband 906 values. A mean squared error (MSE) may be calculated for the simulated cooling system shown in FIG. 9, according to some embodiments. In some embodiments, the MSE is determined based on a difference between setpoint 908 and series 902. FIG. 9 is also shown to include series 914, according to some embodiments. Series 914 illustrates the operational status of the cooling system (e.g., on/off), according to some embodiments.

Figure 10:
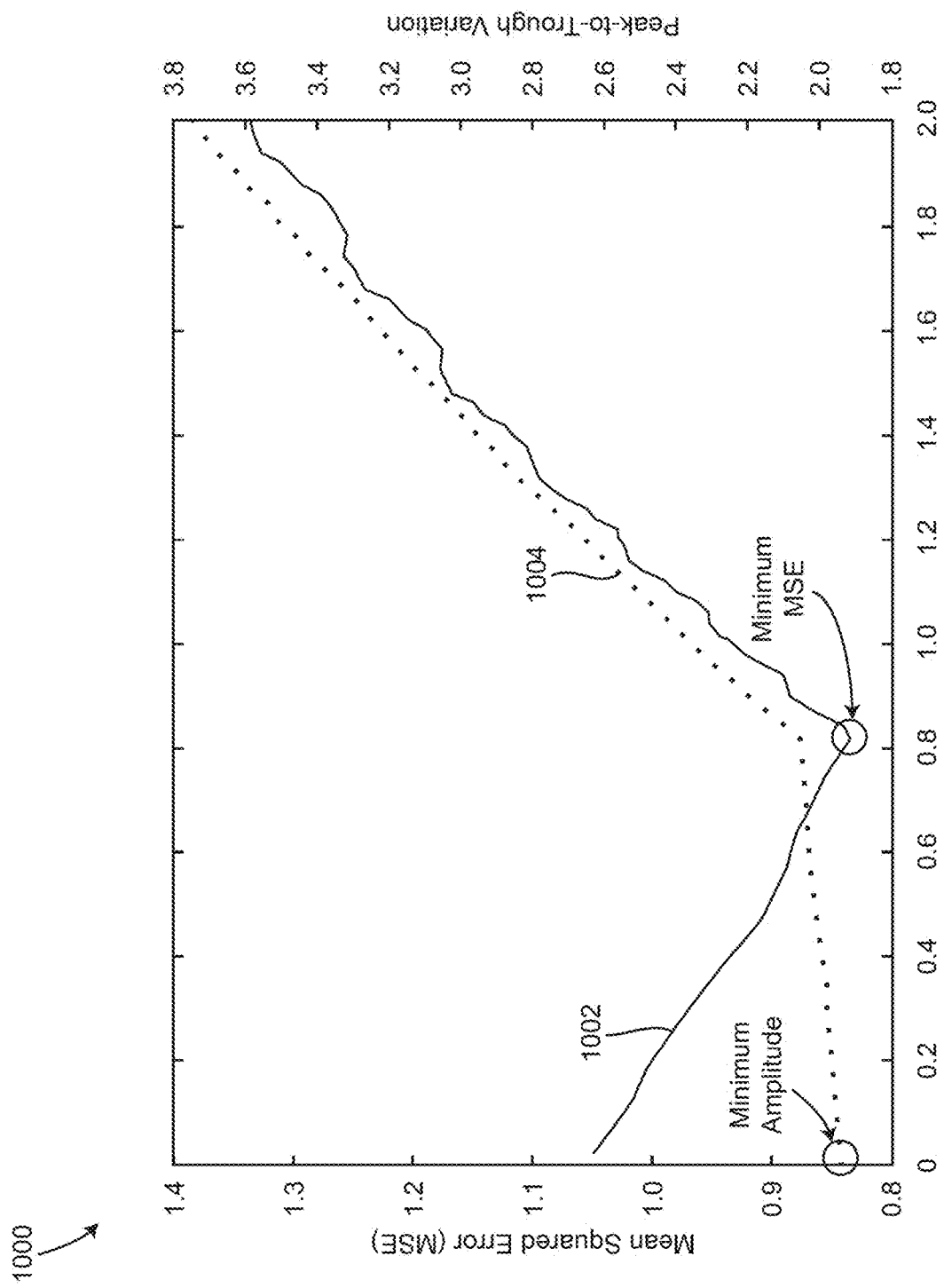
FIG. 10 is a graph showing a relationship between mean squared error of a set of control variable values relative to a setpoint for an on-off system and various deadband values, and a relationship between peak-to-trough amplitude of the set of control variable values and various deadband values, according to some embodiments.

Referring now to FIG. 10, a graph 1000 shows how the MSE (left axis) varies against the deadband (horizontal axis) for the simulated cooling system of FIG. 9, according to some embodiments. Graph 1000 is shown to include a MSE plot 1002 illustrating the MSE related to the deadband value, according to some embodiments. Graph 1000 is also shown to include a peak-to-trough plot 1004 illustrating the peak-to-trough (amplitude) variation (right axis) of the room temperature also plotted against the deadband value, according to some embodiments. The peak-to-trough plot 1004 shows that the peak-to-trough (amplitude) is smallest when the deadband is zero and increases with increasing deadband values. The MSE plot 1002 is shown to be convex-shaped, according to some embodiments, and shows that a clear optimal value exists, at approximately a deadband of 0.8 for the given system. Additionally, graph 1000 shows the advantages of a properly set deadband value. The potential improvement in control performance by determining the optimal deadband value is significant. FIG. 10 shows that the optimal deadband value can improve control performance by more than 20% compared to selecting a deadband value which is too large or too small.

Heuristic Method

In some embodiments, an optimal deadband value is determined with a heuristic method, as described hereinbelow. In some embodiments, the heuristic method described is performed by heuristic module 814 of deadband controller 801 of FIG. 8. In some embodiments, the heuristic method described is performed by BMS controller 366 of FIG. 4. The heuristic method is described hereinbelow with reference to FIGS. 11-12, according to some embodiments.

Figure 11:
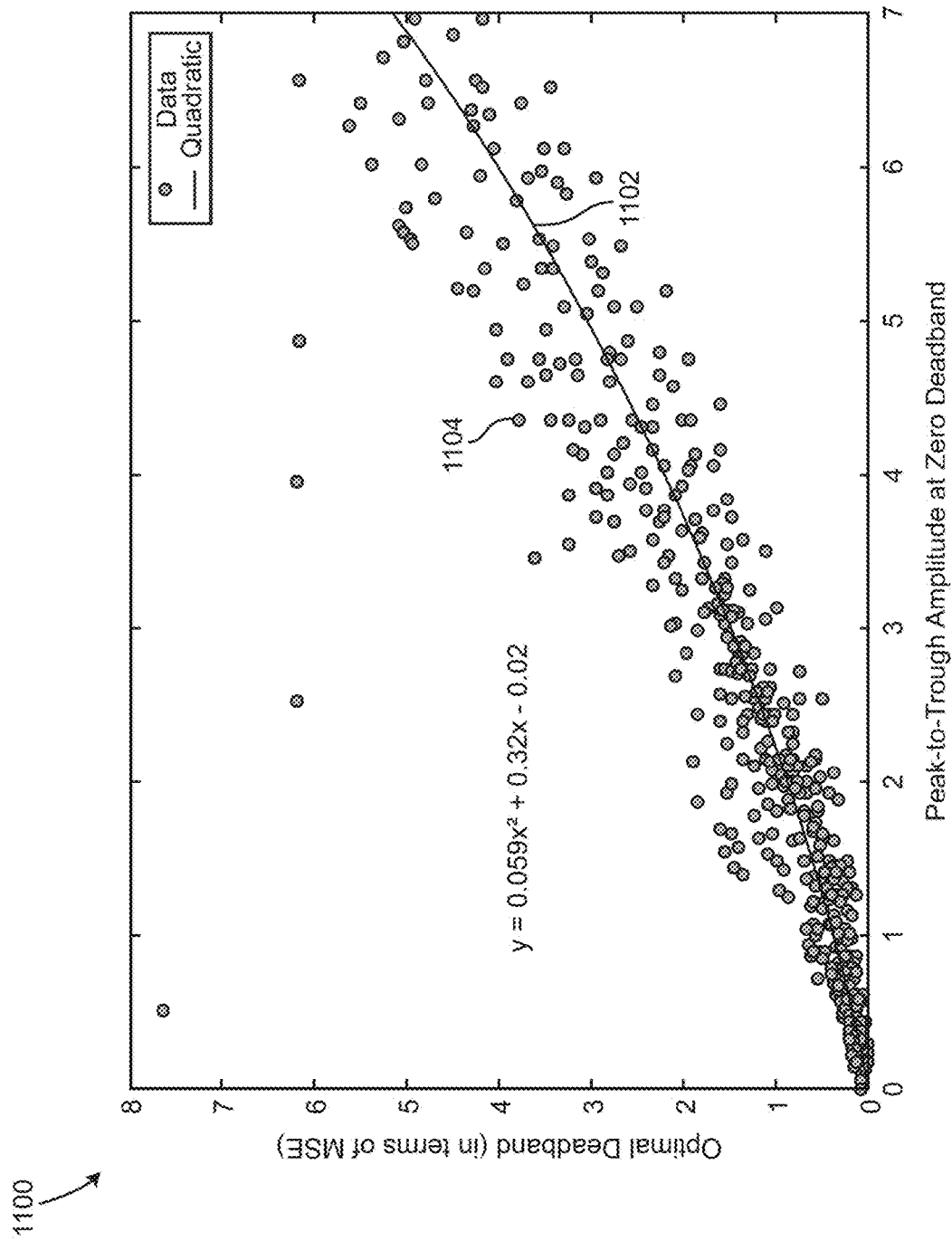
FIG. 11 is a graph showing an empirically determined relationship between a determined optimal deadband value (in terms of MSE) and a peak-to-trough amplitude at a negligible deadband value, according to some embodiments.

Referring now to FIG. 11, a graph 1100 is shown, illustrating a relationship between an optimal deadband (in terms of MSE, where the optimal deadband is a deadband value corresponding to a minimal MSE) and peak-to-trough amplitude at a deadband value of zero, according to some embodiments. The heuristic method is developed by performing tests to establish the relationship between the optimal deadband (in terms of MSE) and the smallest peak-to-trough amplitude that would be achievable in a system when the deadband value is set to zero or a very small value. In some embodiments, graph 1100 shows the relationship between the optimal deadband value and the peak-to-trough amplitude from a negligible deadband value for any given on-off system. This relationship is useful since the peak-to-trough amplitude for a given system can be easily estimated in practice by starting the controller with a very small deadband and then observing the response. Graph 1100 shows data 1104 from a large set of simulation tests for an on-off system using 1,000 different systems, plant, and room characteristics, according to some embodiments. Graph 1100 demonstrates the relationship between minimum observable amplitude for a very small deadband and the optimal deadband value that minimizes the mean squared setpoint error, according to some embodiments. Graph 1100 is shown to include a quadratic curve fit 1102 to the data 1104, according to some embodiments. The quadratic curve fit 1102 is determined to follow the equation $y=0.059x^2+0.32x-0.02$, hereinafter referred to as the deadband equation, according to some embodiments, where y (also referred to as d) is the optimal deadband value (in terms of MSE), and x (also referred to as a) is the peak-to-trough amplitude at zero deadband. The quadratic curve fit equation may be used to determine the optimal deadband value (in terms of MSE) based on the peak-to-trough amplitude at zero (or near-zero) deadband, according to some embodiments.

Figure 12:
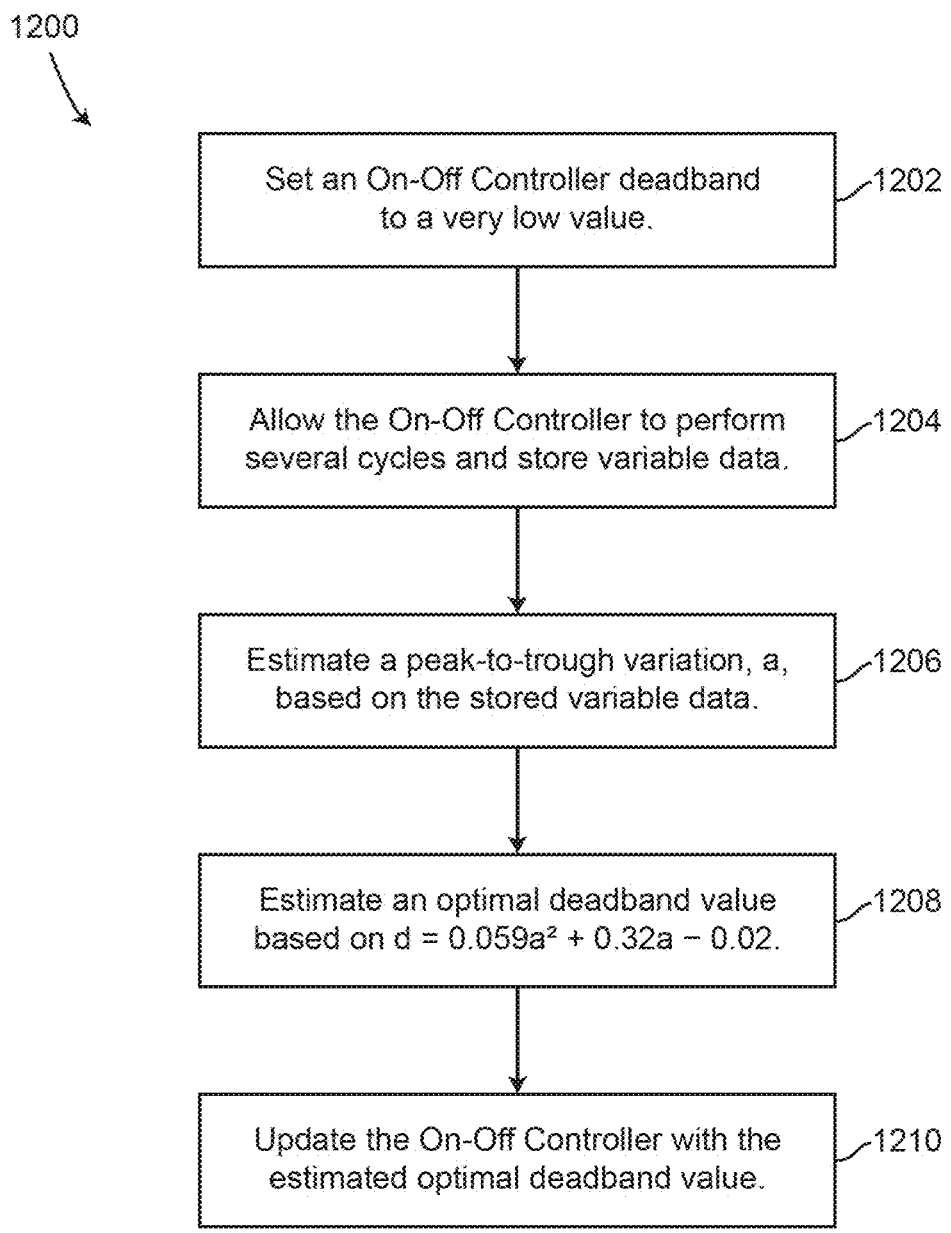
FIG. 12 is a flowchart illustrating a process for determining an optimal deadband value of an on-off system using a heuristic method, according to some embodiments.

Referring now to FIG. 12, a method 1200 is shown, according to some embodiments. Method 1200 is shown to include steps 1202-1210, according to some embodiments. In some embodiments, any of steps 1202-1210 are performed by deadband controller 801 of FIG. 8. In some embodiments, any of steps 1202-1210 are performed by BMS controller 366 of FIG. 4. Method 1200 is shown to include setting an on-off controller deadband to a very low value (step 1202), according to some embodiments. In some embodiments, the on-of controller is configured to control an on-off system or equipment configured to selectively operate in an operational and an in-operational state (e.g., a heating unit, a cooling unit, a sump pump, etc.). Step 1202 is performed by a controller configured to adjust an operation of the on-off controller, according to some embodiments. For example, step 1202 may be performed by deadband controller 801 of FIG. 8. In some embodiments, step 1202 may be performed by BMS controller 366 of FIG. 4. In some embodiments, the deadband value is set to zero or a near-zero value. In some embodiments, the very low deadband value is a negligible deadband value. In some embodiments, the on-off controller is the on-off controller of on-off system 824 of FIG. 8. In some embodiments, step 1202 is performed by heuristic module 814 of deadband controller 801.

Method 1200 is shown to include allowing the on-off controller to perform several cycles and storing data regarding a control variable of the on-off system (step 1204), according to some embodiments. Step 1204 may be performed by any on-off system. In some embodiments, step 1204 is performed by on-off system 824 of FIG. 8. In some embodiments, step 1204 is facilitated by deadband controller 801 of FIG. 8. In some embodiments, the control variable data is stored in a database and/or memory of a controller (e.g., deadband controller 801 or BMS controller 366) configured to adjust an operation of the on-off controller. In some embodiments, the control variable data is received from the on-off system through an input interface (e.g., input interface 820 of deadband controller 801 of FIG. 8) and is stored in memory. In some embodiments, the on-off controller outputs information regarding the operational state of the equipment configured to be controlled by the on-off controller (e.g., whether or not the equipment is in operation) and a sensor of the on-off system configured to monitor the control variable of the on-off system transmits the information of the monitored control variable. In some embodiments, both of the information regarding the operational state of the equipment configured to be controlled by the on-off controller and the information regarding the monitored control variable (e.g., from the on-off controller of the on-off system and from the sensor of the on-off system, respectively) is received by a controller (e.g., deadband controller 801 of FIG. 8 and/or BMS controller 366 of FIG. 4). In some embodiments, the on-off controller is allowed to perform multiple cycles (e.g., the on-off controller is allowed to function until it actuates the equipment between the operational state and the in-operational state more than a predetermined number of times greater than one). In some embodiments, step 1204 is performed by heuristic module 814 of deadband controller 801.

Method 1200 is shown to include estimating a peak-to-trough variation, a, based on the stored control variable information (step 1206), according to some embodiments. In some embodiments, the peak-to-trough variation is peak-to-trough value 904 of FIG. 9. In some embodiments, the peak-to-trough variation is defined as a difference between a high value and a low value of the stored control variable information (e.g., a difference between a high temperature and a low temperature of a room). In some embodiments, the high value and the low value are taken as a high value after a predetermined amount of high values and/or low values have occurred. In some embodiments, the high value and the low value are averages of a set of high values of the stored control variable information and a set of low values of the stored control variable information. In some embodiments, a third occurring high value (or a fourth occurring, or a fifth occurring, or a sixth occurring, etc.) is used as the high value and a third occurring low value (or a fourth occurring, or a fifth occurring, or a sixth occurring, etc.) is used as the low value. In some embodiments, a high value and a low value are selected after an overall average of the stored control variable over a time horizon (e.g., a quantity of time, a number of samples, etc.) is substantially stable (e.g., a standard deviation of the overall average of the stored control variable over the time horizon is below a predetermined value, a mean squared error of the overall average of the stored control variable over the time horizon is below a predetermined value, etc.). For example, the system may be allowed to achieve a stable operating state (i.e., the overall average of the stored control variable over the time horizon is substantially stable as described hereinabove), and then one or more high values occurring after the system has reached the stable operating state are used (e.g., averaged) as the high value, and one or more low values occurring after the system has reached steady state. In some embodiments, step 1206 is performed by heuristic module 814 of deadband controller 801.

Method 1200 is shown to include estimating an optimal deadband value with the deadband equation (step 1208) described above with reference to FIG. 11 using the peak-to-trough variation, α, according to some embodiments. In some embodiments, the optimal deadband value is determined using the deadband equation by a controller (e.g., deadband controller 801 and/or BMS controller 366, as described in greater detail above). In some embodiments, step 1208 is performed by heuristic module 814 of deadband controller 801.

Method 1200 is shown to include updating the on-off controller with the estimated optimal deadband value (step 1210), according to some embodiments. In some embodiments, the estimated optimal deadband value is the optimal deadband value determined in step 1208. In some embodiments, a controller (e.g., deadband controller 801 of FIG. 8 and/or BMS controller 366 of FIG. 4) is configured to output a control signal (e.g., through an output interface such as output interface 822) to update the on-off controller with the optimal deadband value. In some embodiments, the system is transitioned to an in-operational state before the on-off controller is updated with the optimal deadband value. In some embodiments, the on-off controller is updated with the optimal deadband value while the system is in operation.

ESC Optimization Method

Referring now to FIGS. 13-17, an alternative method for determining the optimal deadband value is described in greater detail, according to some embodiments. The alternative method discussed below may be referred to as an ESC optimization method. The ESC optimization method may be performed locally by a controller (e.g., deadband controller 801 and/or BMS controller 366, etc.) or may be performed on a remote device (e.g., a server) configured to communicably connect with a controller. The ESC optimization method uses an exponentially weighted average algorithm and an extremum seeking control to locate the optimal deadband value, according to some embodiments. In some embodiments, the ESC optimization method described hereinbelow can be modified so that the cost function includes additional measures (e.g., equipment wear, control performance, etc.) such that a deadband value can be selected which also optimizes the additional measures. For example, the ESC optimization method may additionally take into account equipment wear, so that a deadband value which minimizes error but results in undesirable wear of equipment is not selected.

Figure 13:
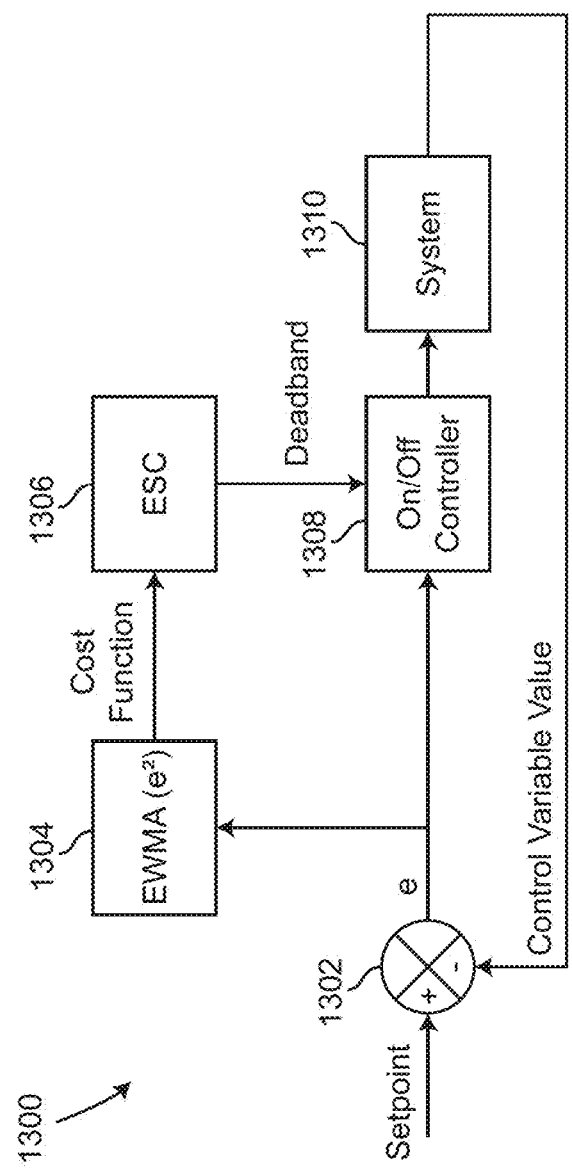
FIG. 13 is a block diagram of a system which can determine an optimal deadband value of an on-off system using an extremum seeking controller, according to some embodiments.

Referring now to FIG. 13, a block diagram 1300 of the ESC optimization method is shown, according to some embodiments. Block diagram 1300 is shown to include a summing junction, shown as summing junction 1302, according to some embodiments. Summing junction 1302 may receive a setpoint value, and a control variable value as shown in FIG. 13. Summing junction 1302 is configured to determine a difference between the setpoint value and the control variable value, according to so some embodiments. In some embodiments, summing junction 1302 assigns a positive sign to the setpoint value, and a negative sign to the control variable value, then sums the setpoint value and the control variable value with the assigned signs to determine the difference. In some embodiments, the difference between the setpoint value and the control variable value is defined as an error value. If a magnitude of the setpoint value exceeds a magnitude of the control variable value, the error value is a positive value, according to some embodiments. If the magnitude of the setpoint value is less than the magnitude of the control variable value, the error value is a negative value, according to some embodiments. In some embodiments, the setpoint value is a present value of the setpoint. In some embodiments, the control variable value is a present value of the control variable. In some embodiments, the control variable value is a set of control variable values over a time horizon. Summing junction 1302 may determine a set of error values, with each element of the set of error values being a difference between the setpoint value and a corresponding control variable value, determined as described hereinabove. Summing junction 1302 is configured to provide the determined error value(s) to EWMA module 1304 and/or on/off controller 1308, according to some embodiments. In some embodiments, any of the functionality of summing junction 1302 as described herein is performed by a controller (e.g., deadband controller 801), and/or a module of a controller (e.g., MSE module 818).

Referring still to FIG. 13, block diagram 1300 is shown to include EWMA module 1304, according to some embodiments. EWMA module 1304 is shown receiving the determined error, and providing ESC module 1306 with a cost function, according to some embodiments. EWMA module 1304 is configured to perform an exponentially weighted moving average algorithm to the determined error squared, according to some embodiments. In some embodiments, EWMA module 1304 performs the exponentially weighted moving average algorithm to a mean squared error of the setpoint and the control variable value. EWMA module 1304 may store a set of determined error (or determined MSE error) values over a previous time horizon and assign a unique weighting value to each of the determined error (or determined MSE error) values. In some embodiments, the unique weighting values follow an exponential decay trend, with more recent determined error (or determined MSE error) values having a larger weighting term, and less recent determined error (or determined MSE error) values having a smaller weighting term. EWMA module 1304 may determine an exponentially weighted moving average, and the exponentially weighted moving average may be provided to ESC module 1306 as the cost function. According to some embodiments, EWMA module 1304 is a controller (e.g., deadband controller 801) and/or a module of a controller (e.g., EWMA module 810 of FIG. 8).

Referring still to FIG. 13, block diagram 1300 is shown to include ESC module 1306, according to some embodiments. In some embodiments, ESC module 1306 is configured to perform an extremum seeking control process to determine the optimal deadband value. ESC module 1306 may be configured to perform any other gradient descent method to determine the optimal deadband value. In some embodiments, ESC module 1306 is a controller (e.g., deadband controller 801). In some embodiments, ESC module 1306 is either of system 600 or system 700, and performs any or all of the functionality of system 600 and system 700, as described in greater detail above with reference to FIGS. 6-7. In some embodiments, the performance variable of ESC module 1306 is the MSE of the control variable information. For example, the performance variable to be improved is the MSE, since the MSE quantifies how close to the setpoint value the control variable value is over a time horizon. In some embodiments, the manipulated variable of ESC module 1306 for the ESC process is the deadband value. In some embodiments, the performance variable of ESC module 1306 is the cost function as determined by EWMA module 1304. In some embodiments, the performance variable of ESC module 1306 is the EWMA as determined by EWMA module 1304.

Referring still to FIG. 13, block diagram 1300 is shown to include on/off controller 1308 and on/off system 1310, according to some embodiments. On/off controller 1308 is configured to adjust an operation of on/off system 1310, according to some embodiments. In some embodiments, on/off controller 1308 is configured to adjust an operation of equipment of on/off system 1310 where the equipment is actuatable between an operational state and an in-operational state (i.e., an on-state and an off-state) and is configured to affect a property (e.g., an environmental property) of the on/off system 1310. On/off controller 1308 is shown receiving a deadband value from ESC module 1306, according to some embodiments. ESC module 1306 updates the deadband value of on/off controller 1308 to the deadband value determined by the ESC process. In some embodiments, ESC module 1306 is configured to modulate the deadband value of on/off controller 1308 to determine an optimal deadband value. In some embodiments, the exponentially weighted average (EWMA) of the squared error signal is used as the cost function and ESC module 1306 attempts to minimize this by adjusting the deadband for the on/off controller 1308.

Figure 14:
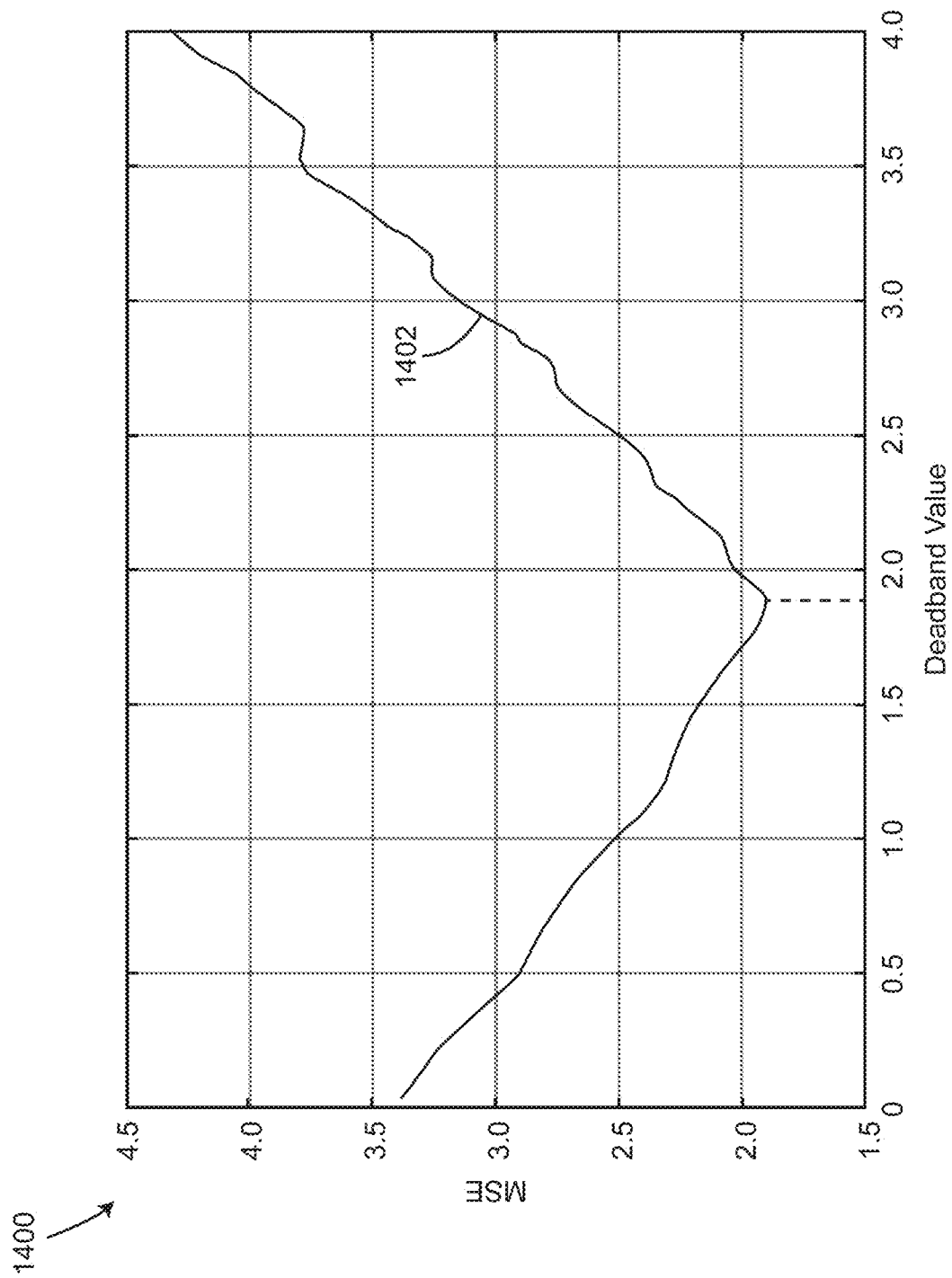
FIG. 14 is a graph showing a relationship between mean squared error and deadband values for a simulated on-off system, according to some embodiments.

Referring now to FIG. 14, a graph 1400 of a static map for a simulation test to demonstrate the ESC-based deadband optimization is shown, according to some embodiments. Graph 1400 is shown to include series 1402, which illustrates a relationship between MSE and deadband, according to some embodiments. In some embodiments, graph 1400 of the static map is predetermined in order to perform the simulation test. However, graph 1400 may represent the relationship between MSE and deadband in a real system (e.g., series 1402 is shown convex-shaped). From the graph 1400, it can be seen that the optimal deadband value is approximately 1.8, as indicated by the deadband value which minimizes the MSE (e.g., the value at the convex point). In the simulation test, the system is a room with a thermostat and a cooling device controlled by an on-off controller, according to some embodiments.

Figure 15:
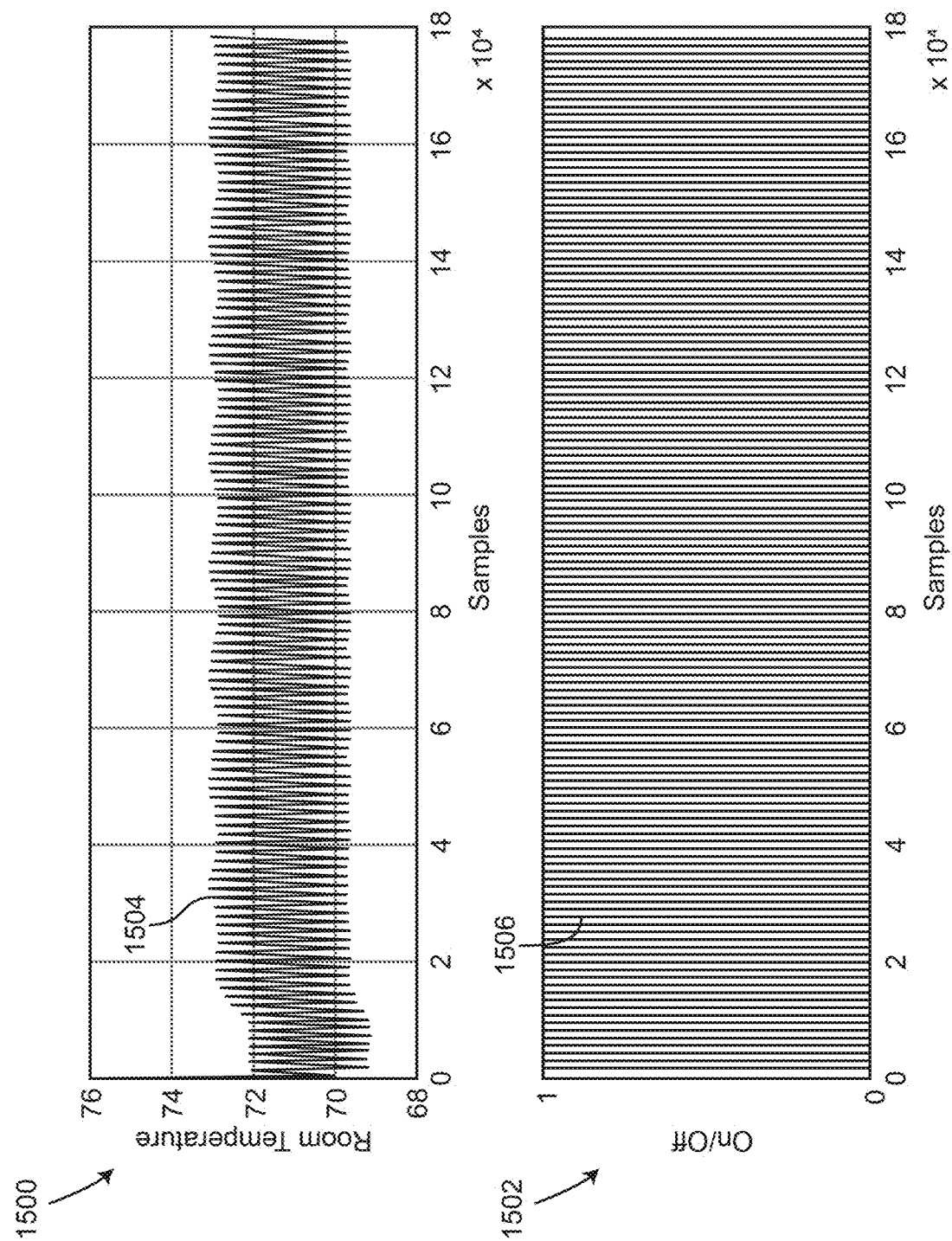
FIG. 15 is a set of graphs showing a relationship between a control variable of the simulated on-off system of FIG. 14 over a time horizon and an operational state of equipment of the simulated on-off system of FIG. 14 over the time horizon, according to some embodiments.

Referring now to FIG. 15, two graphs, 1500 and 1502 are shown, according to some embodiments. Graphs 1500 and 1502 show the results of the system of FIG. 14 (e.g., the room with the cooling device and thermostat) while an ESC system (e.g., the system represented by block diagram 1300 as shown in FIG. 13) determines the optimal deadband value, according to some embodiments. The ESC system modulates the deadband value of the on-off controller to determine the optimal deadband value as described in greater detail above with reference to FIGS. 6-7, according to some embodiments. Graph 1500 shows the room temperature (vertical axis) versus the number of samples recorded (horizontal axis), and includes series 1504 demonstrating room temperature changing relative to the number of samples recorded, according to some embodiments. Graph 1502 shows the operational status of the cooling device (i.e., actuating between either an on-state or an off-state) on the vertical axis and the number of samples recorded. Series 1506 illustrates the actuation between the operational (e.g., on) state and the in-operational (e.g., off) state, relative to the number of samples recorded, according to some embodiments.

Figure 16:
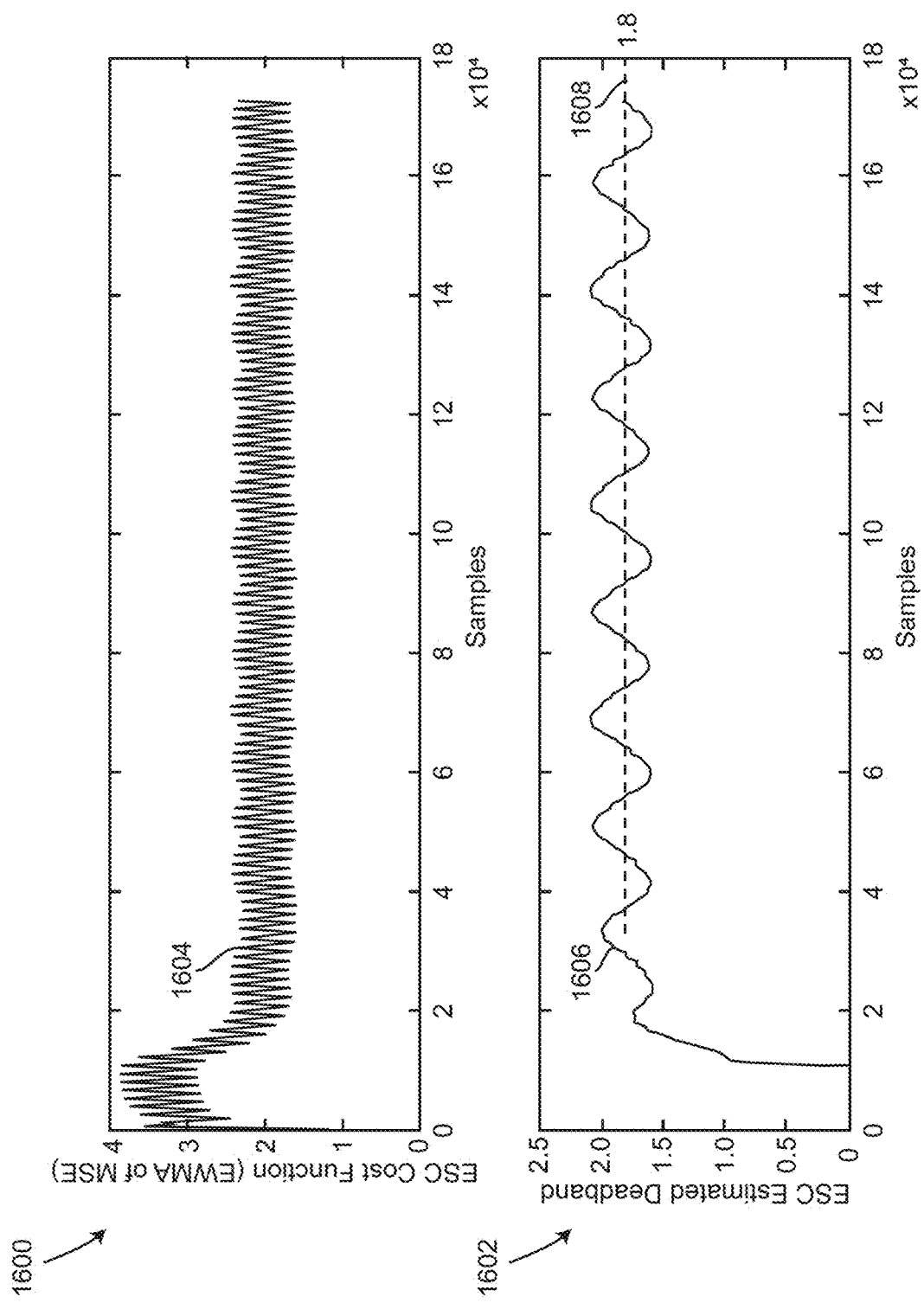
FIG. 16 is a set of graphs showing a cost function of the simulated on-off system used by an extremum seeking controller over a time horizon and an optimal deadband determined by the extremum seeking controller over the time horizon, according to some embodiments.

Referring now to FIG. 16, two graphs, 1600 and 1602, are shown, according to some embodiments. Graph 1600 is shown to include series 1604, illustrating the cost function used by the ESC (e.g., used by ESC module 1306 of FIG. 13, or used by ESC 602 of FIG. 6), according to some embodiments. Graph 1602 is shown to include series 1606, illustrating the optimal deadband value estimated by the ESC, according to some embodiments. From graph 1602, it can be seen that the average optimal deadband value as determined by the ESC is value 1608, according to some embodiments. Value 1608 is shown to be approximately equal to 1.8, which matches the identified optimal deadband value for the simulated system, as shown in FIG. 14, according to some embodiments. FIGS. 15-16 serve to illustrate the accuracy and reliability of the ESC optimization method, according to some embodiments.

Figure 17:
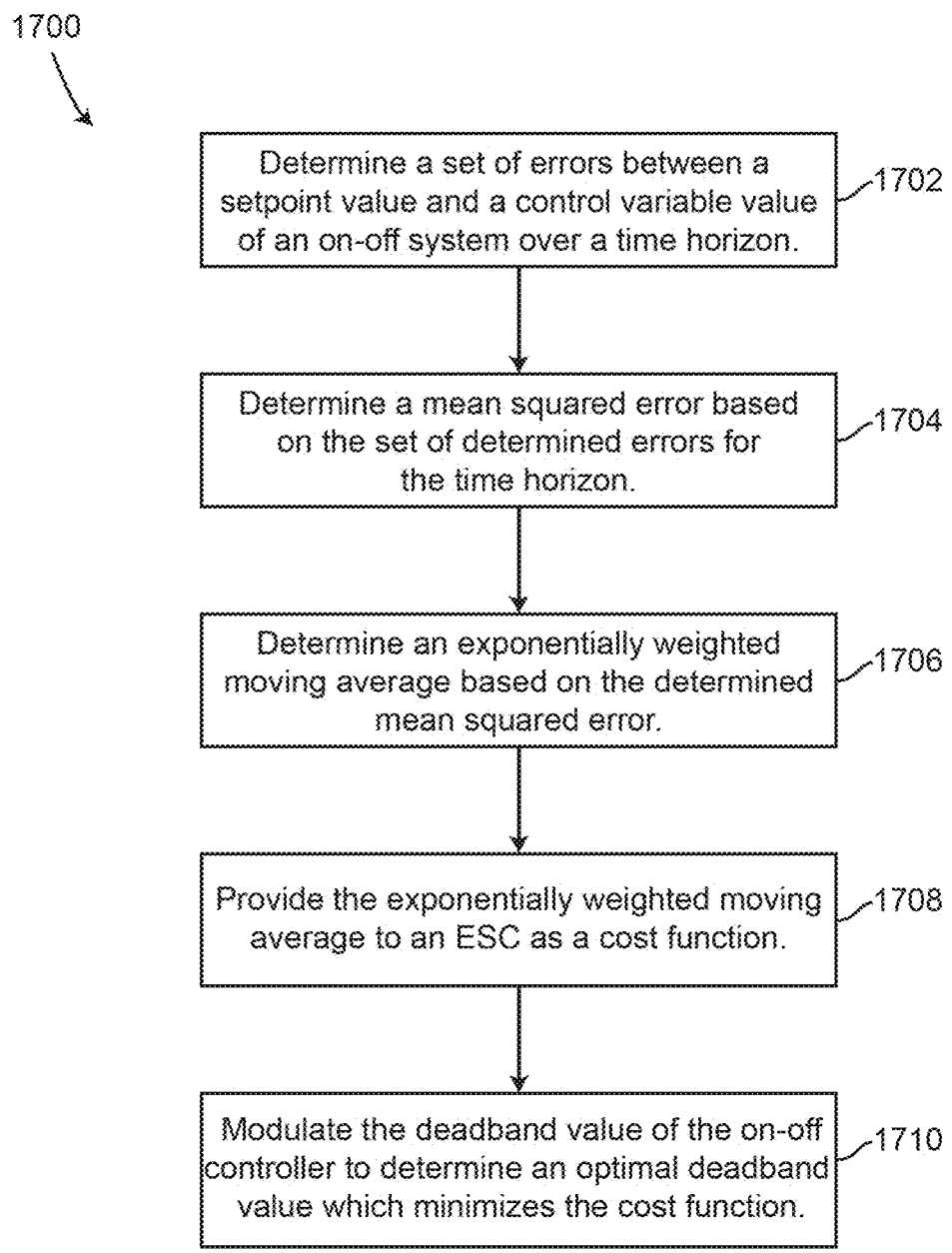
FIG. 17 is a flowchart illustrating a process for determining an optimal deadband value of an on-off system using an extremum seeking controller, according to some embodiments.

Referring now to FIG. 17, a method 1700 illustrating the steps of the ESC optimization method is shown, according to some embodiments. Method 1700 is shown to include steps 1702-1710, according to some embodiments. Any of steps 1702-1710 of method 1700 may be performed by a controller (e.g., deadband controller 801, ESC 602, ESC 702, BMS controller 366). Method 1700 is shown to include determining a set of errors between a setpoint value and a control variable value of an on-off system over a time horizon (step 1702), according to some embodiments. Step 1702 may be performed by a controller (e.g., deadband controller 801, ESC 602, ESC 702, BMS controller 366) configured to receive information from the on-off system and determine an error (e.g., a difference) between the received setpoint value and the received control variable value.

Method 1700 is shown to include determining a mean squared error based on the set of determined errors for the time horizon (step 1704), according to some embodiments. Step 1704 may be performed by MSE module 818, according to some embodiments. In some embodiments, step 1704 is performed over a pre-determined time horizon. In some embodiments, step 1704 is performed by allowing the on-off system to operate to collect the required data to calculate the mean squared error.

Method 1700 is shown to include determining an exponentially weighted moving average based on the determined mean squared error (step 1706), according to some embodiments. In some embodiments, step 1706 is performed by EWMA module 1304, and/or EWMA module 810 of deadband controller 801. Each of the mean squared error values are assigned a weighting term, with the weighting terms exponentially decreasing as applied to the older mean squared error values.

Method 1700 is shown to include providing the exponentially weighted moving average to an extremum seeking controller as a cost function (step 1708), according to some embodiments. The ESC may be configured to minimize the cost function (e.g., to perform a gradient descent method to determine optimal deadband value), according to some embodiments. In some embodiments, the ESC may use the cost function (e.g., the EWMA of the error squared) to find the deadband value which minimizes the error.

Method 1700 is shown to include modulating the deadband value of the on-off controller to determine an optimal deadband value which minimizes the cost function (step 1710), according to some embodiments. In some embodiments, step 1710 is performed by a controller (e.g., deadband controller 801) configured to adjust an operation of the on-off controller (e.g., adjust the deadband value of the on-off controller) and to receive information regarding the setpoint, the deadband value, and the control variable value. In some embodiments, step 1710 is performed by any of ESC 602 and/or ESC 702. In some embodiments, after modulating the deadband value of the on-off controller, some or all of steps 1702-1708 may be repeated.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An on-off control system comprising:
   on-off equipment configured to operate in either an on state or an off state;
   an on-off controller configured to cause the on-off equipment to transition between the on state and the off state based on a setpoint value and a deadband value to drive a control variable toward the setpoint value; and
   a deadband controller configured to generate the deadband value used by the on-off controller that cause the on-off equipment to transition between the on state and the off state by:
      obtaining a cost function that defines a cost based on at least a set of control values and a variable representing the deadband value;
      selecting a value of the variable representing the deadband value that results in an optimal value of the cost function from a range of possible deadband values; and
      providing the selected value of the variable representing the deadband value for use as the deadband value to the on-off controller.

2. The system of claim 1, wherein the deadband controller is configured to minimize the cost function using extremum seeking control to select the value of the variable representing the deadband value that results in the optimal value of the cost function.

3. The system of claim 1, wherein the cost function comprises at least one of:
   a determined difference between a peak and a trough of a collected set of control variable values;
   an absolute error of the collected set of control variable values relative to the setpoint value;

a mean squared error of the collected set of control variable values relative to the setpoint value; and an exponentially weighted average of the mean squared error of the collected set of control variable values.

4. The system of claim 3, wherein the deadband controller is further configured to generate the deadband value based on an empirical relationship between the determined difference and the selected value of the variable representing the deadband value.

5. The system of claim 3, wherein the deadband controller is configured to cause the on-off controller to operate with a negligible deadband value and collect the set of control variable values over a predetermined time horizon.

6. The system of claim 3, wherein the deadband controller is configured to generate the deadband value by generating a dither signal for a signal associated with adjusting the deadband value used by the on-off controller, and wherein the deadband controller is further configured to select the value of the variable representing the deadband value that results in an optimal value of the cost function by filtering the mean squared error of the collected set of control variable values.

7. The system of claim wherein the deadband controller is further configured to generate the deadband value by modulating the variable representing the deadband value.

8. The system of claim 1, wherein the cost function further comprises one or more terms that account for at least one of equipment wear, cycle frequency, and control performance.

\* \* \* \* \*